US012603990B2

(12) United States Patent
Deng et al.

(10) Patent No.: US 12,603,990 B2
(45) Date of Patent: Apr. 14, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, Los Angeles, CA (US); Kai Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 98 days.

(21) Appl. No.: 18/569,561

(22) PCT Filed: Jun. 22, 2022

(86) PCT No.: PCT/CN2022/100469
§ 371 (c)(1),
(2) Date: Dec. 12, 2023

(87) PCT Pub. No.: WO2023/273987
PCT Pub. Date: Jan. 5, 2023

(65) Prior Publication Data
US 2024/0275944 A1      Aug. 15, 2024

(30) Foreign Application Priority Data
Jun. 29, 2021    (WO) ................ PCT/CN2021/103169

(51) Int. Cl.
*H04N 19/105*          (2014.01)
*H04N 19/139*          (2014.01)
(Continued)

(52) U.S. Cl.
CPC ......... *H04N 19/105* (2014.11); *H04N 19/139* (2014.11); *H04N 19/176* (2014.11); *H04N 19/513* (2014.11); *H04N 19/70* (2014.11)

(58) Field of Classification Search
CPC .. H04N 19/105; H04N 19/139; H04N 19/176; H04N 19/513; H04N 19/52; H04N 19/70
See application file for complete search history.

(56) References Cited

U.S. PATENT DOCUMENTS

2019/0246118 A1 * 8/2019 Ye ........................ H04N 19/176
2020/0322635 A1    10/2020 Koo et al.
(Continued)

FOREIGN PATENT DOCUMENTS

CN        108028939 A      5/2018
CN        110677648 A      1/2020
(Continued)

OTHER PUBLICATIONS

International Search Report in PCT/CN2022/100469, mailed Aug. 23, 2022, 3 pages.

*Primary Examiner* — Jessica M Prince
(74) *Attorney, Agent, or Firm* — Astute IP Law Group

(57) ABSTRACT
Embodiments of the present disclosure provide a method for video processing. The method comprises: determining, during a conversion between a current video block of a video and a bitstream of the video, whether to insert a target motion candidate for the current video block into a prediction list for the current video block based on a comparison between the target motion candidate and at least one existing motion candidate in the prediction list; and performing the conversion based on the determination. The proposed method can advantageously fill the prediction list more efficiently.

21 Claims, 14 Drawing Sheets

1500

1502
DETERMINE TARGET MOTION INFORMATION FOR THE CURRENT VIDEO BLOCK BASED ON A TARGET APPROACH DETERMINED FROM AN IMPLICIT MOTION REFINEMENT APPROACH AND AN EXPLICIT MOTION REFINEMENT APPROACH

1504
PERFORM THE CONVERSION BASED ON THE TARGET MOTION INFORMATION

(51) Int. Cl.
    *H04N 19/176*      (2014.01)
    *H04N 19/513*      (2014.01)
    *H04N 19/70*       (2014.01)

(56) References Cited

U.S. PATENT DOCUMENTS

| | | | |
|---|---|---|---|
| 2020/0389663 A1* | 12/2020 | Li | H04N 19/176 |
| 2021/0314596 A1* | 10/2021 | Wang | H04N 19/105 |
| 2021/0368180 A1* | 11/2021 | Park | H04N 19/139 |
| 2022/0078488 A1* | 3/2022 | Leleannec | H04N 19/52 |
| 2022/0182661 A1* | 6/2022 | Lee | H04N 19/1883 |

FOREIGN PATENT DOCUMENTS

| | | |
|---|---|---|
| CN | 111201792 A | 5/2020 |
| CN | 112970262 A | 6/2021 |

* cited by examiner

400

500

700

810 ⌁

L0 Reference

820 ⌁

L1 Reference

1000 ⟍

1110 ⟍

| Merge index | L0 MV | L1 MV |
|:---:|:---:|:---:|
| 0 | x | |
| 1 | | x |
| 2 | x | |
| 3 | | x |
| 4 | x | |

1300

1302

DETERMINE WHETHER TO INSERT A TARGET MOTION CANDIDATE FOR THE CURRENT VIDEO BLOCK INTO A PREDICTION LIST FOR THE CURRENT VIDEO BLOCK BASED ON A COMPARISON BETWEEN THE TARGET MOTION CANDIDATE AND AT LEAST ONE EXISTING MOTION CANDIDATE IN THE PREDICTION LIST

1304

PERFORM THE CONVERSION BASED ON THE DETERMINATION

1400

1402

REORDER A PREDICTION LIST FOR THE CURRENT VIDEO BLOCK IF A TEMPLATE MATCHING BASED MOTION REFINEMENT MAY BE APPLIED TO MOTION CANDIDATES FOR THE CURRENT VIDEO BLOCK

1404

PERFORM THE CONVERSION BASED ON THE REORDERED PREDICTION LIST

1500

1502

DETERMINE TARGET MOTION INFORMATION FOR THE CURRENT VIDEO BLOCK BASED ON A TARGET APPROACH DETERMINED FROM AN IMPLICIT MOTION REFINEMENT APPROACH AND AN EXPLICIT MOTION REFINEMENT APPROACH

1504

PERFORM THE CONVERSION BASED ON THE TARGET MOTION INFORMATION

METHOD, APPARATUS, AND MEDIUM FOR VIDEO PROCESSING

CROSS-REFERENCE TO RELATED APPLICATIONS

This is a national stage application filed under 37 U.S.C. 371 based on International Patent Application No. PCT/CN2022/100469, filed Jun. 22, 2022, which claims priority to International Patent Application No. PCT/CN2021/103169 filed with the China National Intellectual Property Administration (CNIPA) on Jun. 29, 2021, the disclosures of which are incorporated herein by reference in its entirety their entireties.

FIELD

Embodiments of the present disclosure relates generally to video coding techniques, and more particularly, to pruning of prediction list and concatenation of merge mode with motion vector differences (MMVD) and template matching.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally expected to be further improved.

SUMMARY

In a first aspect, a method for video processing is proposed. The method comprises: determining, during a conversion between a current video block of a video and a bitstream of the video, whether to insert a target motion candidate for the current video block into a prediction list for the current video block based on a comparison between the target motion candidate and at least one existing motion candidate in the prediction list; and performing the conversion based on the determination.

According to the method in accordance with the first aspect of the present disclosure, a target motion candidate is compared with at least one existing motion candidate in the prediction list to determine whether to insert the target motion candidate into the prediction list. Thereby, the proposed method can advantageously prune and fill the prediction list more efficiently, and thus the coding efficiency may be improved.

In a second aspect, another method for video processing is proposed. The method comprises: reordering, during a conversion between a current video block of a video and a bitstream of the video, a prediction list for the current video block if a template matching based motion refinement is applied to motion candidates for the current video block; and performing the conversion based on the reordered prediction list.

According to the method in accordance with the second aspect of the present disclosure, the prediction list is reordered in case that a template matching based motion refinement is applied. Thereby, the proposed method can advantageously improve the coding efficiency and coding quality.

In a third aspect, another method for video processing is proposed. The method comprises: determining, during a conversion between a current video block of a video and a bitstream of the video, target motion information for the current video block based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; and performing the conversion based on the target motion information.

The method in accordance with the third aspect of the present disclosure enables a concatenation of MMVD and template matching, which can advantageously improve the coding efficiency and provide higher coding gain.

In a fourth aspect, an apparatus for processing video data is proposed. The apparatus comprises a processor and a non-transitory memory with instructions thereon. The instructions upon execution by the processor, cause the processor to perform a method in accordance with the first, second or third aspect of the present disclosure.

In a fifth aspect, a non-transitory computer-readable storage medium is proposed. The non-transitory computer-readable storage medium stores instructions that cause a processor to perform a method in accordance with the first, second or third aspect of the present disclosure.

In a sixth aspect, a non-transitory computer-readable recording medium is proposed. The non-transitory computer-readable recording medium stores a bitstream of a video which is generated by a method performed by a video processing apparatus. The method comprises: determining whether to insert a target motion candidate for a current video block of the video into a prediction list for the current video block based on a comparison between the target motion candidate and at least one existing motion candidate in the prediction list; and generating the bitstream based on the determination.

In a seventh aspect, a method for storing a bitstream of a video is proposed. The method comprises: determining whether to insert a target motion candidate for a current video block of the video into a prediction list for the current video block based on a comparison between the target motion candidate and at least one existing motion candidate in the prediction list; generating the bitstream based on the determination; and storing the bitstream in a non-transitory computer-readable recording medium.

In an eighth aspect, another non-transitory computer-readable recording medium is proposed. The non-transitory computer-readable recording medium stores a bitstream of a video which is generated by a method performed by a video processing apparatus. The method comprises: reordering a prediction list for a current video block of the video, if a template matching based motion refinement is applied to motion candidates for the current video block; and generating the bitstream based on the reordered prediction list.

In a ninth aspect, another method for storing a bitstream of a video is proposed. The method comprises: reordering a prediction list for a current video block of the video, if a template matching based motion refinement is applied to motion candidates for the current video block; generating the bitstream based on the reordered prediction list; and storing the bitstream in a non-transitory computer-readable recording medium.

In a tenth aspect, another non-transitory computer-readable recording medium is proposed. The non-transitory computer-readable recording medium stores a bitstream of a video which is generated by a method performed by a video processing apparatus. The method comprises: determining target motion information for a current video block of the video based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; and generating the bitstream based on the target motion information.

In an eleventh aspect, another method for storing a bitstream of a video is proposed. The method comprises: determining target motion information for a current video block of the video based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; generating the bitstream based on the target motion information; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
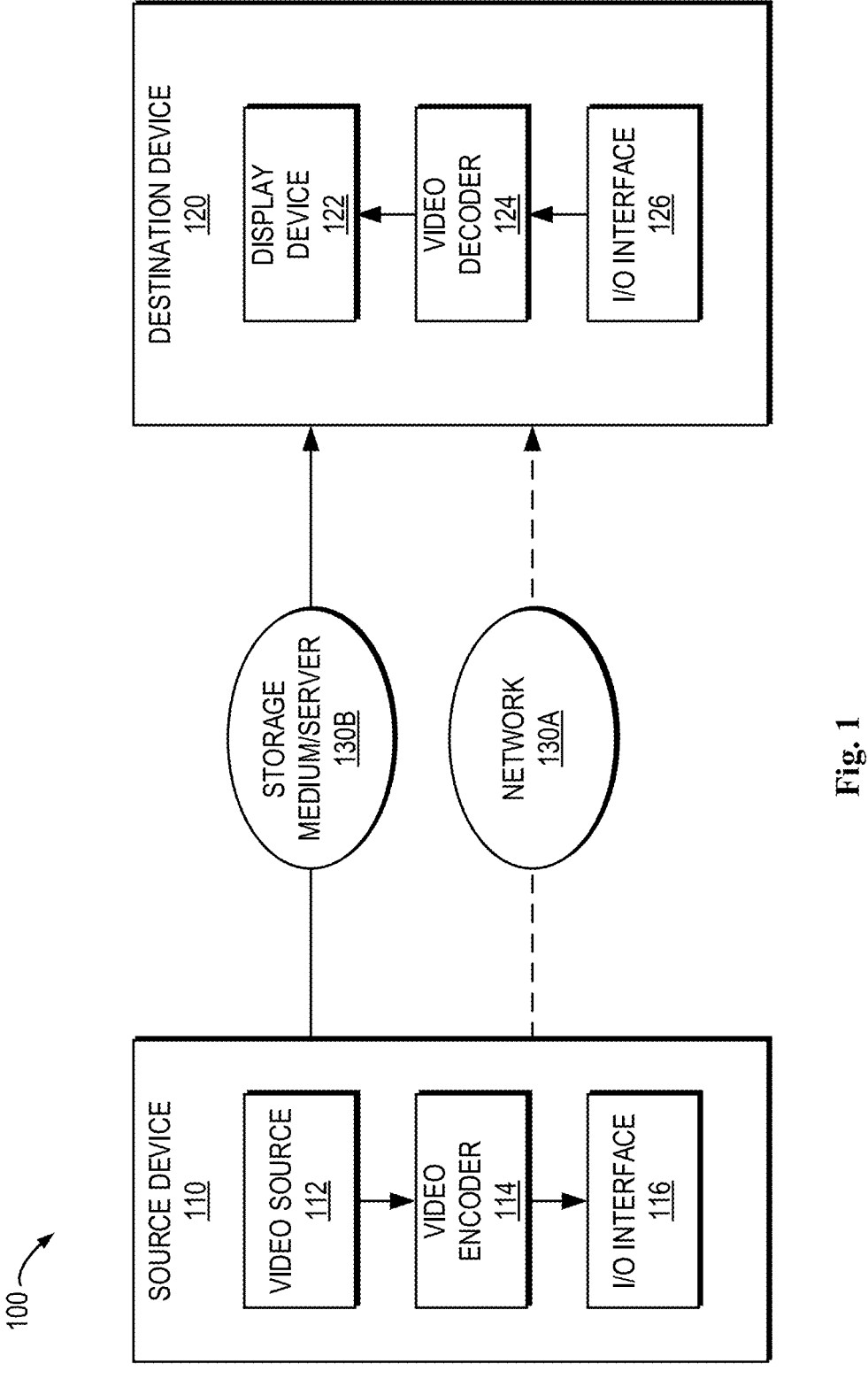
FIG. 1 illustrates a block diagram of an example video coding system in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
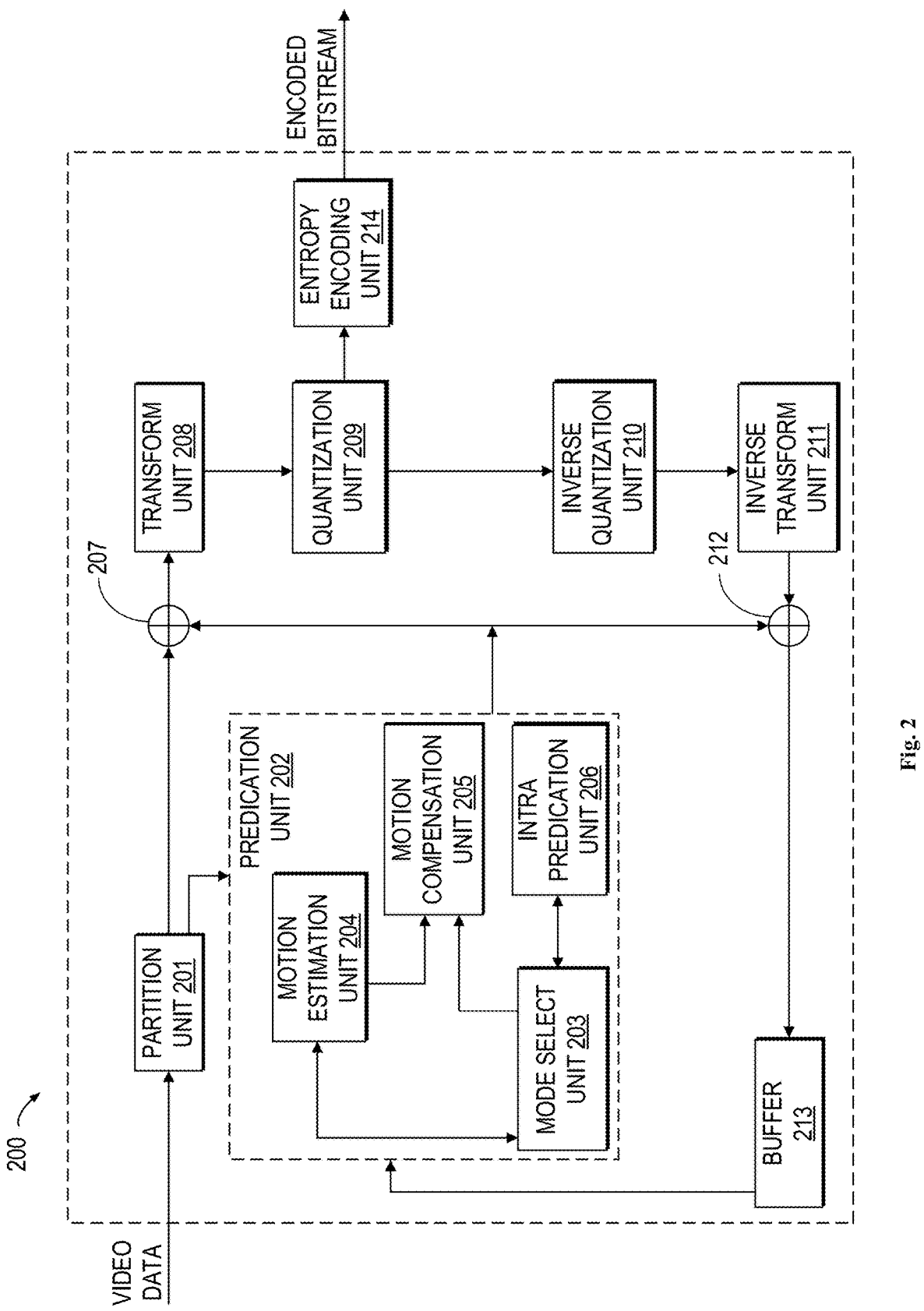
FIG. 2 illustrates a block diagram of an example video encoder in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-prediction.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
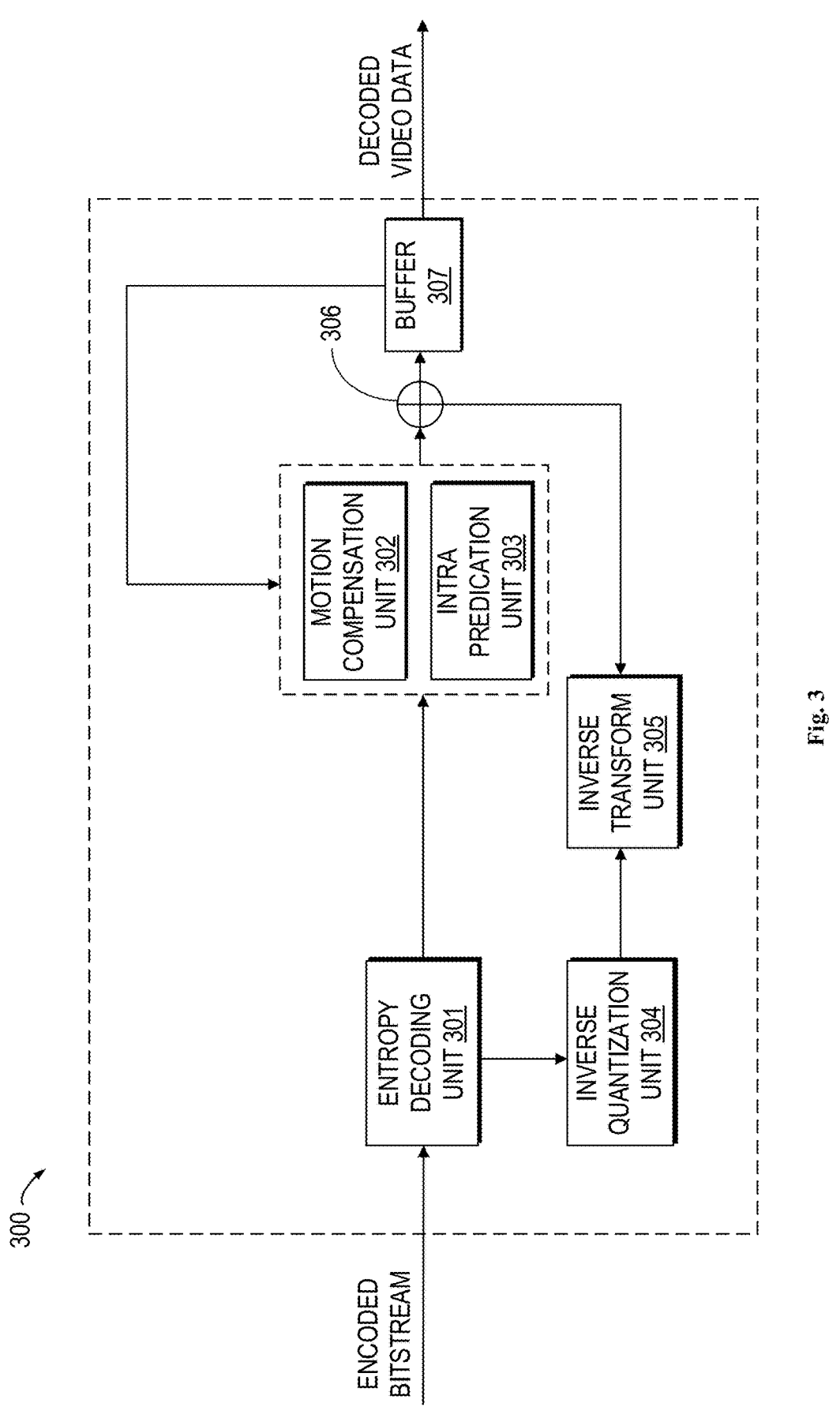
FIG. 3 illustrates a block diagram of an example video decoder in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is about inter prediction and related techniques in video coding. It may be applied to the existing video coding standard like HEVC, VVC, and etc. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

2.1. Coding Tools

Extended Merge Prediction

In VVC, the merge candidate list is constructed by including the following five types of candidates in order:
  1) Spatial MVP from spatial neighbour CUs
  2) Temporal MVP from collocated CUs
  3) History-based MVP from an FIFO table
  4) Pairwise average MVP
  5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.1..1. Spatial Candidates Derivation

Figure 4:
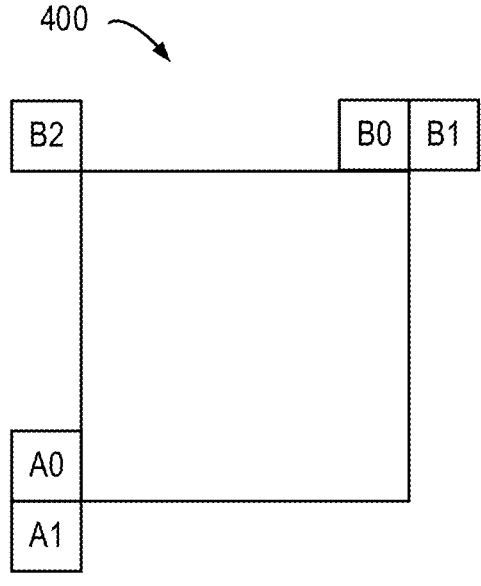
FIG. 4 is a schematic diagram illustrating positions of a spatial merge candidate.
Figure 5:
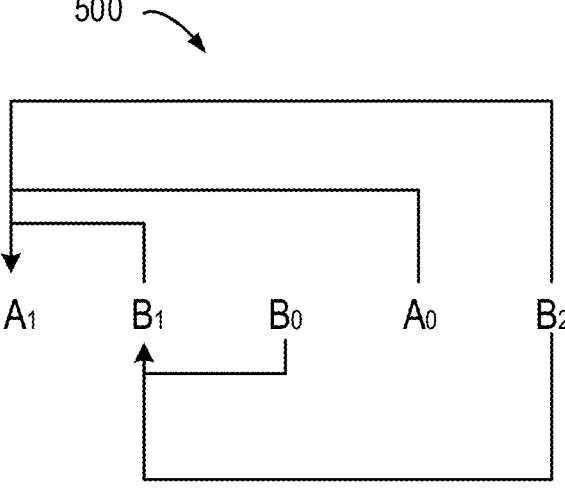
FIG. 5 is a schematic diagram illustrating candidate pairs considered for redundancy check of spatial merge candidates.

The derivation of spatial merge candidates in VVC is same to that in HEVC except the positions of first two merge candidates are swapped. A maximum of four merge candidates are selected among candidates located in the positions depicted in FIG. 4. FIG. 4 is a schematic diagram 400 illustrating positions of a spatial merge candidate. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. FIG. 5 is a schematic diagram 500 illustrating candidate pairs considered for redundancy check of spatial merge candidates. To reduce computational complexity, not all possible candidate pairs are considered in the mentioned redundancy check. Instead only the pairs linked with an arrow in FIG. 5 are considered and a candidate is only added to the list if the corresponding candidate used for redundancy check has not the same motion information.

2.1..2. Temporal Candidates Derivation

Figure 6:
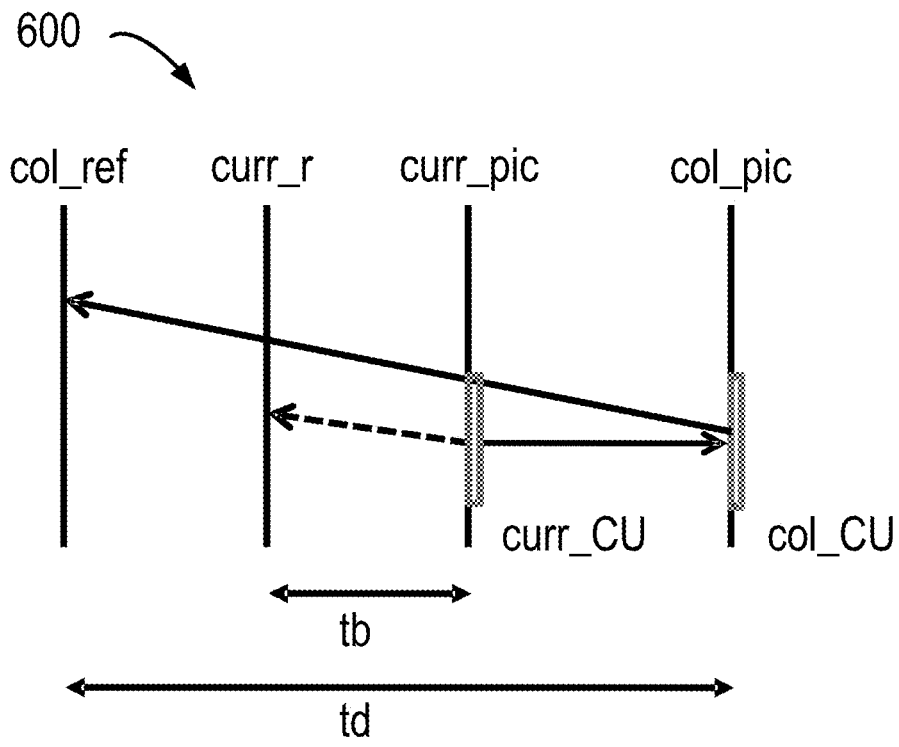
FIG. 6 is a schematic diagram illustrating motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. FIG. 6 is a schematic diagram 600 illustrating motion vector scaling for temporal merge candidate. The scaled motion vector for temporal merge candidate is obtained as illustrated by the dotted line in FIG. 6, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 7:
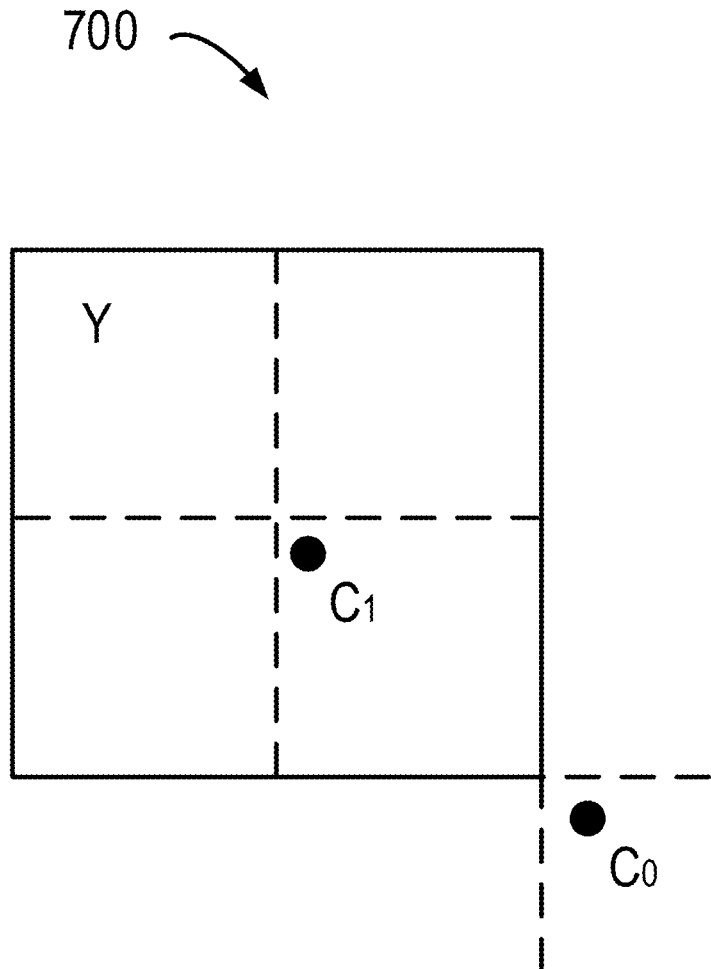
FIG. 7 is a schematic diagram illustrating candidate positions for temporal merge candidate, $C_0$ and $C_1$.

FIG. 7 is a schematic diagram 700 illustrating candidate positions for temporal merge candidate, $C_0$ and $C_1$. The position for the temporal candidate is selected between candidates $C_0$ and $C_1$, as depicted in FIG. 7. If CU at position $C_0$ is not available, is intra coded, or is outside of the current row of CTUs, position $C_1$ is used. Otherwise, position $C_0$ is used in the derivation of the temporal merge candidate.

2.1..3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4)?M: (8–N), wherein N indicates number of existing candidates in the merge list and M indicates number of available HMVP candidates in the table.
2. Once the total number of available merge candidates reaches the maximally allowed merge candidates minus 1, the merge candidate list construction process from HMVP is terminated.

2.1..4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.1..5. Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Figure 8:
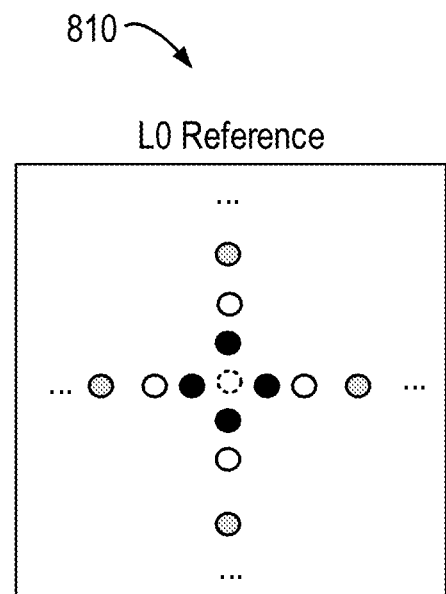
FIG. 8 is a schematic diagram illustrating a merge mode with motion vector differences (MMVD) search point.
Figure 8:
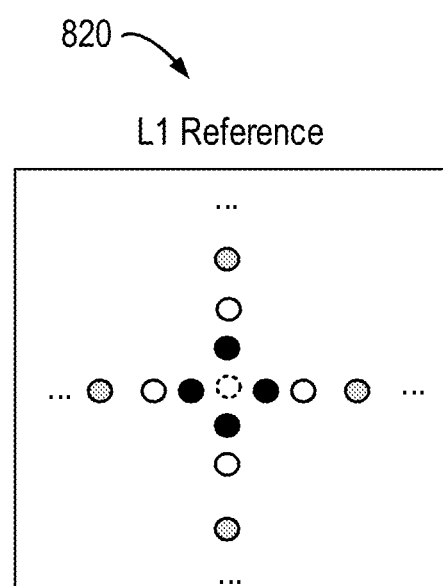

Distance index specifies motion magnitude information and indicate the pre-defined offset from the starting point. FIG. 8 is a schematic diagram illustrating a merge mode with motion vector differences (MMVD) search point. As shown in FIG. 8, an offset is added to either horizontal component or vertical component of starting MV. The relation of distance index and pre-defined offset is specified in Table 1

TABLE 1

| The relation of distance index and pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 2. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

| Sign of MV offset specified by direction index | | | | |
|---|---|---|---|---|
| Direction IDX | 00 | 01 | 10 | 11 |
| x-axis | + | – | N/A | N/A |
| y-axis | N/A | N/A | + | – |

Decoder Side Motion Vector Refinement (DMVR)

Figure 9:
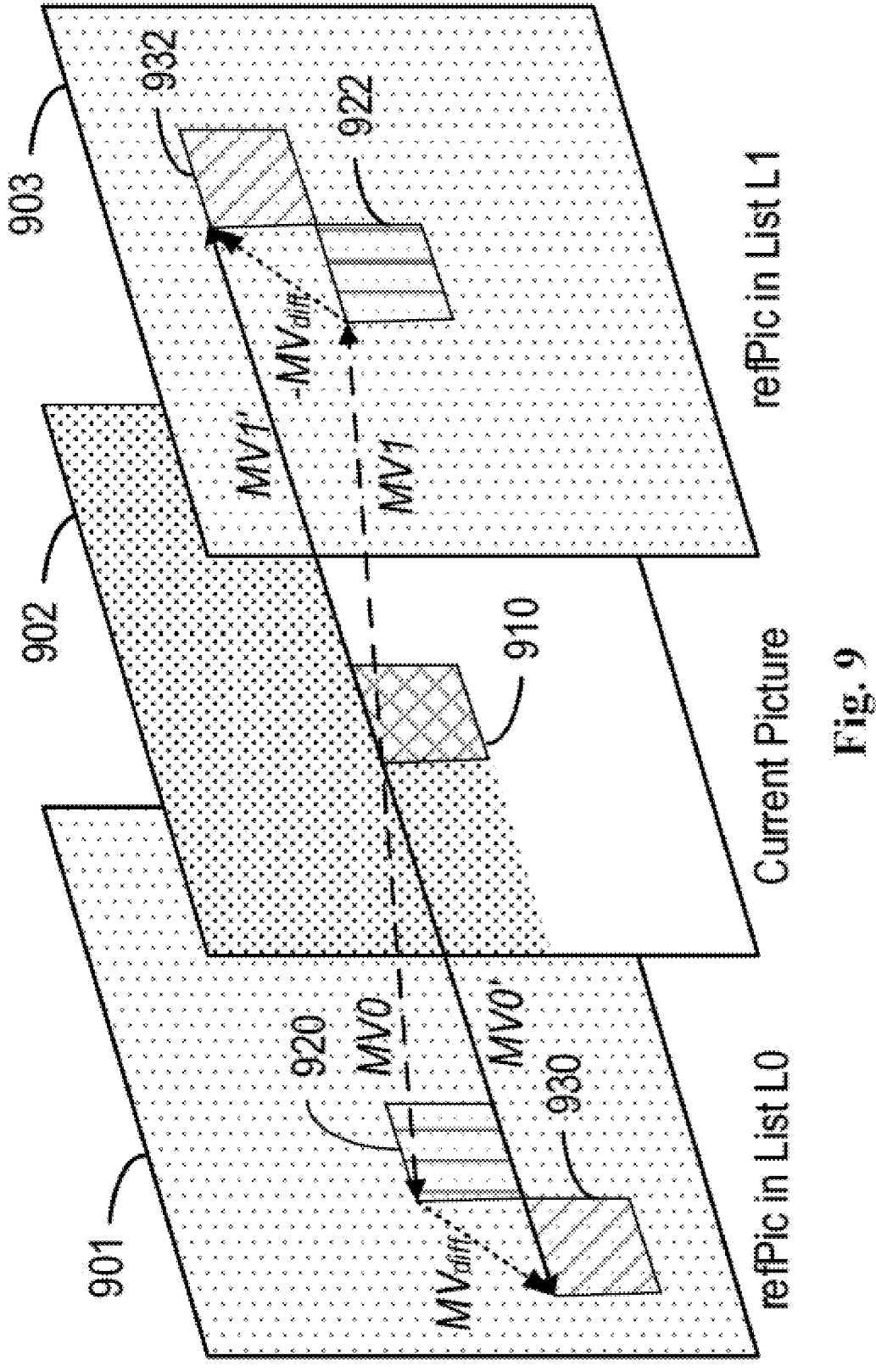
FIG. 9 is a schematic diagram illustrating the decoding side motion vector refinement.

In order to increase the accuracy of the MVs of the merge mode, a bilateral-matching based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 9 is a schematic diagram illustrating the decoding side motion vector refinement. As illustrated in FIG. 9, the SAD between the blocks 930 and 932 based on each MV candidate around the initial MV is calculated. The MV candidate with the lowest SAD becomes the refined MV and used to generate the bi-predicted signal.

In VVC, the DMVR can be applied for the CUs which are coded with following modes and features:

CU level merge mode with bi-prediction MV

One reference picture is in the past and another reference picture is in the future with respect to the current picture The distances (i.e. POC difference) from two reference pictures to the current picture are same Both reference pictures are short-term reference pictures CU has more than 64 luma samples Both CU height and CU width are larger than or equal to 8 luma samples BCW weight index indicates equal weight WP is not enabled for the current block CIIP mode is not used for the current block The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.1..1. Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0, = MV0 + MV\_offset \qquad (1)$$

$$MV1, = MV1 - MV\_offset \qquad (2)$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \qquad (3)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0))) \qquad (4)$$

$$y_{min} = (E(0, -1) - E(0, 1))/(2((E(0, -1) + E(0, 1) - 2E(0, 0))) \qquad (5)$$

The value of $x_{min}$ and $y_{min}$ are automatically constrained to be between −8 and 8 since all cost values are positive and the smallest value is E(0,0). This corresponds to half peal offset with ¹⁄₁₆th-pel MV accuracy in VVC. The computed fractional $(x_{min}, y_{min})$ are added to the integer distance refinement MV to get the sub-pixel accurate refinement delta MV.

2.1..2. Bilinear-Interpolation and Sample Padding

In VVC, the resolution of the MVs is ¹⁄₁₆ luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.1..3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

Geometric Partitioning Mode (GPM) for Inter Prediction

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric mode. In total 64 partitions are supported by geometric partitioning mode for each possible CU size w×h=$2^m$×$2^n$ with m,n$\in$ {3 . . . 6} excluding 8×64 and 64×8.

Figure 10:
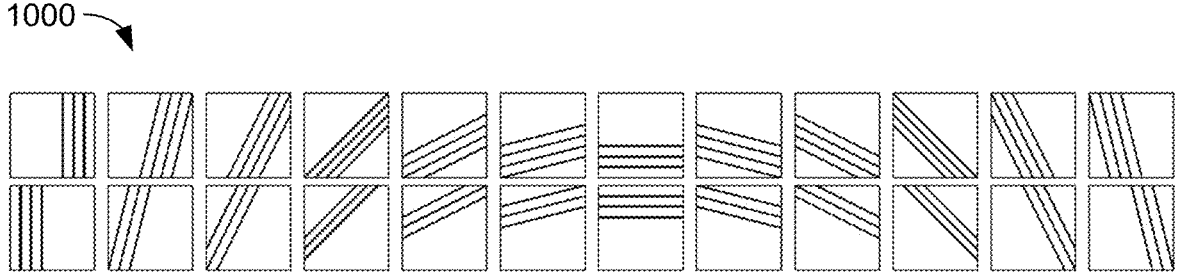
FIG. 10 illustrates examples of the geometric partitioning mode (GPM) splits grouped by identical angles.

FIG. 10 illustrates examples of the geometric partitioning mode (GPM) splits grouped by identical angles. When this mode is used, a CU is split into two parts by a geometrically located straight line (as shown in FIG. 10). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 3.4.1.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 3.4.2. This is the prediction signal for the whole CU, and transform and quantization process will be applied to the whole CU as in other prediction modes. Finally, the motion field of a CU predicted using the geometric partition modes is stored as in 3.4.3.

2.1..1. Uni-Prediction Candidate List Construction

Figure 11:
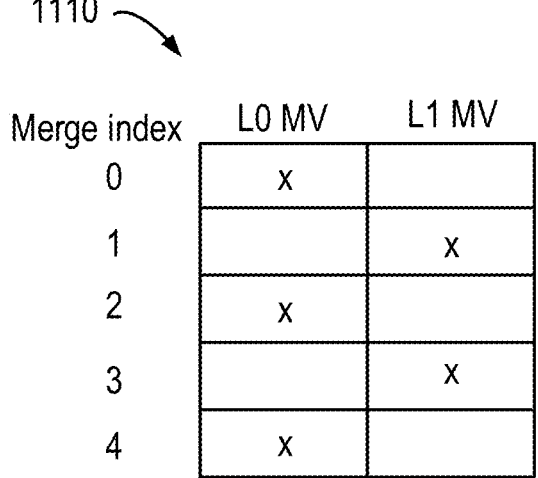
FIG. 11 is a schematic diagram illustrating the uni-prediction MV selection for geometric partitioning mode.

The uni-prediction candidate list is derived directly from the merge candidate list constructed according to the extended merge prediction process in 3.4.1. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in FIG. 11. FIG. 11 is a schematic diagram illustrating the uni-prediction MV selection for geometric partitioning mode. In case a corresponding LX motion vector of the n-the extended merge candidate does not exist, the L(1-X) motion vector of the same candidate is used instead as the uni-prediction motion vector for geometric partitioning mode.

2.1..2. Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j \qquad (6)$$

$$\rho_j = \rho_{x,j}\cos(\varphi_i) + \rho_{y,j}\sin(\varphi_i) \qquad (7)$$

$$\rho_{x,j} = \begin{cases} 0 & i \% 16 = 8 \text{ or } (i \% 16 \neq 0 \text{ and } h \geq w) \\ \pm(j \times w) \gg 2 & \text{otherwise} \end{cases} \qquad (8)$$

$$\rho_{y,j} = \begin{cases} \pm(j \times h) \gg 2 & i \% 16 = 8 \text{ or } (i \% 16 \neq 0 \text{ and } h \geq w) \\ 0 & \text{otherwise} \end{cases} \qquad (9)$$

where i,j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx?32 + d(x, y): 32 - d(x, y) \qquad (10)$$

$$w_0(x, y) = \frac{\text{Clip3}(0, 8, (wIdxL(x, y) + 4) \gg 3)}{8} \qquad (11)$$

$$w_1(x, y) = 1 - w_0(x, y) \qquad (12)$$

Figure 12:
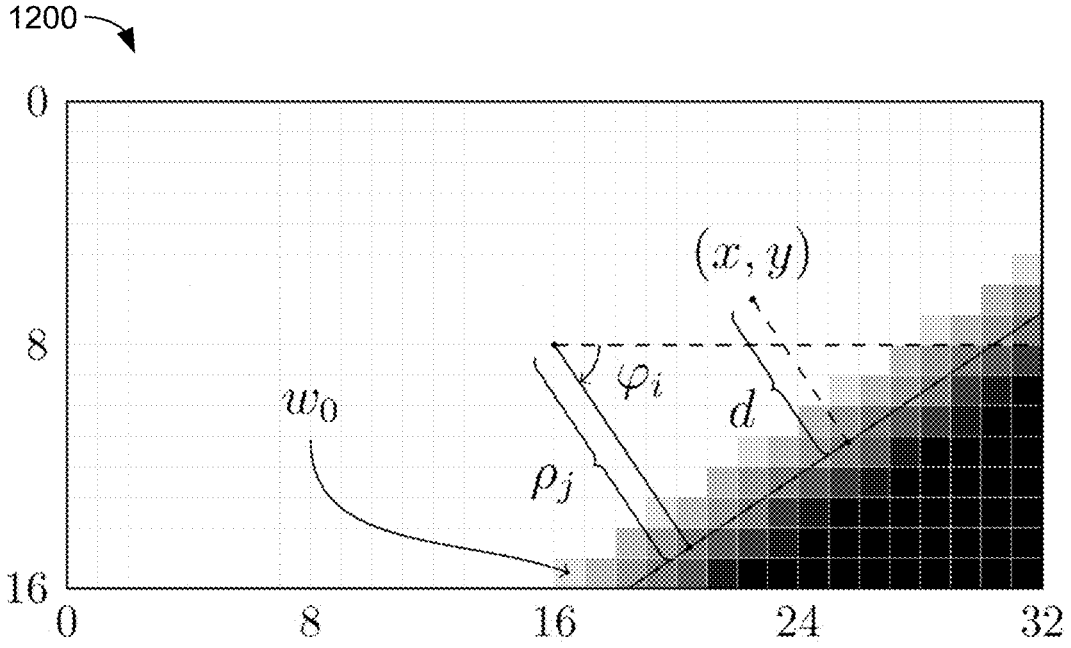
FIG. 12 is a schematic diagram illustrating the exemplified generation of a bending weight $w_0$ using geometric partitioning mode.

The partIdx depends on the angle index i. One example of weigh $w_0$ is illustrated in FIG. 12. FIG. 12 is a schematic diagram 1200 illustrating the exemplified generation of a bending weight $w_0$ using geometric partitioning mode.

2.1..3. Motion Field Storage for Geometric Partitioning Mode

Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

$$sType = \qquad (13)$$

$$\text{abs}(motionIdx) < 32?2: (motionIdx \leq 0?(1 - partIdx): partIdx)$$

where motionIdx is equal to d(4x+2, 4y+2). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:

1) If Mv1 and Mv2 are from different reference picture lists (one from L0 and the other from L1), then Mv1 and Mv2 are simply combined to form the bi-prediction motion vectors.

2) Otherwise, if Mv1 and Mv2 are from the same list, only uni-prediction motion Mv2 is stored.

2.2. Geometric Prediction Mode with Motion Vector Differences (GPM with MMVD)

Using Geometric prediction mode with Motion Vector Difference (GPM with MMVD), each geometric partition in GPM can decide to use MMVD or not. If MMVD is chosen for a geometric region, the MV of the region is calculated as a sum of the MV of a merge candidate and an MVD. All other processing is kept the same as in GPM.

Using GPM with MMVD, an MVD is signaled as a pair of direction and distance, following the current design of MMVD. That is, there are eight candidate distances (¼-pel, ½-pel, 1-pel, 2-pel, 4-pel, 8-pel, 16-pel, 32-pel), and four candidate directions (toward-left, toward-right, toward-above, and toward-below). In addition, when pic_fpel_mmvd_enabled_flag is equal to 1, the MVD in GPM with MMVDis also left shifted by 2 as in MMVD.

2.3. Template-Matching-Based GPM

Template-matching-based GPM is proposed. The MV of a partition of GPM may be refined by a template-matching-based way.

Template matching (TM) refines the motion at the decoder side. In TM mode, motion is refined by constructing a template from left and above neighboring samples and finding the closest match between the template in the current picture and a corresponding area in a reference picture. The TM is applied to AMVR mode and merge mode with MMVD, GPM, CIIP and subblock merge mode disabled.

TM can be extended to GPM. When a CU is coded in GPM, two motion for two geometric partitions are selected from a merge candidate list which is derived in the same way as that in VVC standard. Each motion for the geometric partition can decide whether to be refined using TM. When TM is chosen, a template is constructed using left and above neighboring samples. Then, the motion is refined by finding the minimum difference between the current template and a reference area using the same search pattern of merge mode with half-pel interpolation filter disabled. The refined motion is used to perform motion compensation for the geometric partition and is stored in the motion field.

For the syntax design, when a CU coded in GPM, two additional flags are signaled to indicate whether motion is refined for the two geometric partitions, respectively. Then, the geometric partition mode and two merge indices are further signaled.

2.4. GPM Merge List Generation

The detailed embodiments below should be considered as examples to explain general concepts. These embodiments should not be interpreted in a narrow way. Furthermore, these embodiments can be combined in any manner.

The term 'GPM' may represent a coding method that split one block into two or more sub-regions wherein at least one sub-region is non-rectangular, or non-square, or it couldn't be generated by any of existing partitioning structure (e.g., QT/BT/TT) which splits one block into multiple rectangular sub-regions. In one example, for the GPM coded blocks, one or more weighting masks are derived for a coding block based on how the sub-regions are split, and the final prediction signal of the coding block is generated by a weighted-sum of two or more auxiliary prediction signals associated with the sub-regions.

The term 'GPM' may indicate the geometric merge mode (GEO), and/or geometric partition mode (GPM), and/or wedge prediction mode, and/or triangular prediction mode (TPM), and/or a GPM block with motion vector difference (GMVD), and/or a GPM block with motion refinement, and/or any variant based on GPM.

The term 'block' may represent a coding block (CB), a CU, a PU, a TU, a PB, a TB.

The phrase "normal/regular merge candidate" may represent the merge candidates generated by the extended merge prediction process (as illustrated in section 3.1). It may also represent any other advanced merge candidates except GEO merge candidates and subblock based merge candidates.

Note that a part/partition of a GPM block means a part of a geometric partition in the CU, e.g., the two parts of a GPM block in FIG. 10 are split by a geometrically located straight line. Each part of a geometric partition in the CU is inter-predicted using its own motion, but the transform is performed for the whole CU rather than each part/partition of a GPM block.

It should also be noticed that GPM/GMVD applied to other modes (e.g., AMVP mode) may also use the following methods wherein the merge candidate list may be replaced by an AMVP candidate list.

1. It is proposed that the GPM/GMVD candidate index of a block being equal to K may be corresponding to motion information derived from a regular merge candidate with index being equal to M in the regular merge candidate list wherein K is unequal to M, and the derived motion information is used for coding the block.
   1. In one example, M is greater than K.
   2. Whether to use the regular merge candidate with index being equal to K or M may depend on the decoded information and/or the candidates in the regular merge candidate list.

2. Pruning process may be applied during the GPM/GMVD merge list construction wherein motion candidates may be derived using the parity of candidate indices.
   a. In one example, GPM/GMVD merge list is constructed, then the GPM/GMVD merge list is modified by pruning.
   b. In one example, pruning is applied when inserting a candidate into the GPM/GMVD merge list, during the list construction process.
   c. For example, full pruning may be applied.
   d. For example, partial pruning may be applied.
   e. For example, whether to insert a candidate to a GPM/GMVD merge list, may be dependent on whether it has similar/different motion data as compared with one or more candidates in the list.
   f. For example, whether to insert a candidate to a GPM/GMVD merge list, may be dependent on how similar/different between this candidate and one or more candidates in the list.
   g. For example, the above comparison may be applied between the candidate and all available candidates in the GPM/GMVD merge list.
   h. For example, the above comparison may be applied between the candidate and one candidate in the GPM/GMVD merge list, wherein the one candidate may be in a predefined position.
   i. For example, the above comparison may be conducted by checking the motion data difference such as prediction direction (L0, L1), motion vectors, POC value, and/or any other inter-prediction mode (such as affine, BCW, LIC) etc.

j. For example, the above comparison may be conducted based on a rule that whether the motion difference is greater than or smaller than a threshold.

k. For example, the above comparison may be conducted based on a rule that whether the motion of the two are identical.

l. In above examples, the GMVD candidate is representing the motion information derived from the associated GPM candidate plus the selected MVD.

3. If the number of valid GPM merge candidates is less than a threshold, at least one additional GPM merge candidate may be generated to fill in the GPM merge candidate list.

1. For example, the value of the threshold may be obtained by a syntax element.

a. For example, the syntax element may be a value specifying the maximum GPM merge candidates in the GPM merge candidate list or the maximum number of regular merge candidates.

2. For example, one or more GPM merge candidates may be generated based on the existing GPM merge candidates in the GPM merge candidate list.

a. For example, the L0 motion of the first X (such as X=2) L0 predicted GPM merge candidates in the GPM merge list may be averaged and inserted to the GPM merge list as an additional GPM merge candidate.

b. For example, the L1 motion of the first X (such as X=2) L1 predicted GPM merge candidates in the GPM merge list may be averaged and inserted to the GPM merge list as an additional GPM merge candidate.

3. For example, one or more GPM merge candidate may be generated through a history based GPM merge candidate table.

a. For example, the history based GPM merge candidate table is maintained with a length of K (such as K is a constant) GPM motions.

b. For example, the history based GPM merge candidate table contains motion data of L (such as L is a constant) previous coded GPM blocks.

1) For example, both the two motion vectors of the two parts of a GPM coded block are inserted to the history based GPM merge candidate table.

2) For example, one of the two motion vectors of the two parts of a GPM coded block are inserted to the history based GPM merge candidate table.

c. For example, at most M candidates in the history based GPM merge candidate table can be inserted to the GPM merge list.

4. For example, one or more uni-prediction GPM merge candidates may be generated based on the regular merge candidate and its position in the regular merge candidate list.

a. For example, if the parity of a regular merge candidate is an odd number, its L0 motion data may be extracted to construct the GPM merge candidate list.

b. For example, if the parity of a regular merge candidate is an even number, its L1 motion data may be extracted to construct the GPM merge candidate list.

5. For example, one or more uni-prediction zero motion vectors may be inserted to the GPM merge list.

a. For example, L0 predicted zero motion vectors may be inserted.

b. For example, L1 predicted zero motion vectors may be inserted.

c. For example, how many zero motion vectors is inserted to the list may be dependent on the number of active reference pictures in L0/L1 direction.

1) For example, the zero motion vectors may be inserted with an increasing order of a reference index equal to a value from 0 to the number of active reference pictures in L0/L1 direction.

d. Alternatively, furthermore, the maximum number of GPM candidates may be larger than that for regular merge candidate list.

4. One or multiple HMVP tables may be maintained for proceeding blocks coded with GPM/GMVD modes.

1. In one example, the motion information of a GPM/GMVD coded blocks (e.g., a pair of motion vectors as well the associated prediction lists/reference picture information) may be used to update the HMVP tables.

2. In one example, those HMVP tables used for GPM/GMVD modes are maintained independently from those used for non-GPM/GMVD modes.

5. Motion information from non-adjacent spatial blocks may be used to derive the motion information of a GPM/GMVD coded block.

1. In one example, non-adjacent spatial merge candidates may be used to build the GPM merge candidate list.

2. For example, the non-adjacent spatial merge candidates may be generated based on the motion data for neighbor blocks which are not directly adjacent to the current block.

6. Denote a GPM candidate index of a block being equal to K. Even the corresponding LX motion vector of the K-th merge candidate exists (X equal to the parity of K), the L(1-X) motion vector of the K-th candidate could still be used to derive the motion information of the block.

1. In one example, whether to use LX or L(1-X) may depend on the motion information of merge candidates in the regular/GPM merge candidate list.

a. In one example, if the LX motion information is identical to one or more GPM candidates with indices smaller than K, then L(1-X) motion information may be used.

2. Whether to insert L0 motion or L1 motion to construct the uni-prediction GPM merge list, may be dependent on the accumulated value of the prediction directions from the already inserted GPM merge candidates in the GPM merge list. Suppose X denotes the number of L0 prediction GPM merge candidates precede the current GPM candidate to be inserted, and Y denotes the number of L1 prediction merge candidates precede the current GPM candidate to be inserted.

a. For example, when X minus Y is no smaller than a threshold (such as 0 or 1 or 2), L1 motion may be extracted from a bi-prediction normal merge candidate and inserted to be as a GPM merge candidate.

1) Additionally, in such case, L1 motion of a L1 prediction normal merge candidate may be directly inserted to be as a GPM merge candidate.

2) Additionally, in such case, a L0 prediction normal merge candidate may be projected to L1 and inserted to be as a GPM merge candidate.

b. For example, when X minus Y is no greater than a threshold (such as 0 or −1 or −2), L0 motion may be extracted from a bi-prediction normal merge candidate and inserted to be as a GPM merge candidate.

1) Additionally, in such case, L0 motion of a L0 prediction normal merge candidate may be directly inserted to be as a GPM merge candidate.

2) Additionally, in such case, a L1 prediction normal merge candidate may be projected to L0 and inserted to be as a GPM merge candidate.

7. In one example, one bi-prediction normal merge candidate may generate two uni-prediction GPM merge candidates, and both added to GPM/GMVD candidate list.

1. For example, the L0 motion of the bi-prediction normal merge candidate may be used to form a uni-prediction GPM merge candidate, while the L1 motion of the same normal merge candidate is used to form another uni-prediction GPM merge candidate.

8. In one example, both uni-prediction GPM merge candidates and bi-prediction GPM merge candidates may be allowed.

1. For example, it may be allowed that one part of a GPM block is coded from uni-prediction, while the other part of the GPM block is coded from bi-prediction.

2. For example, both the two parts of a GPM block are coded from bi-prediction.

3. For example, when the two parts of a GPM block are coded from uni-prediction, it may be required that one is from L0 prediction, and the other is from L1 prediction.

9. In one example, the regular MMVD based motion vector may be used to build the GPM merge candidate list.

1. For example, L0 or L1 (but not both) motion of the regular MMVD based motion vector may be inserted to the GPM merge candidate list.

2. For example, both L0 and L1 motion of the regular MMVD based motion vector may be inserted to the GPM merge candidate list.

3. For example, the GPM related syntax elements may be signalled in case of regular MMVD is used to the video unit.

10. In one example, the GPM merge candidates in the GPM list may be reordered based on a rule.

1. For example, the rule may be defined as sorting a template cost from small to big values.

2. For example, the template cost may be based on the sum of sample difference between left and/or above neighboring reconstructed samples of the current block and the corresponding neighbors of the reference block.

11. In one example, a GMVD candidate may be compared with a GMVD candidate or a GPM candidate.

1. For example, if the final motion information (after reconstructing the MV from the base MV and MV difference) of a first GMVD candidate is the same or similar to that of a second GMVD or GPM candidate, then the first GMVD candidate is pruned, i.e. it is removed from the possible candidate that can be represented.

2. For example, if the final motion information (after reconstructing the MV from the base MV and MV difference) of a first GMVD candidate is the same or similar to that of a second GMVD or GPM candidate, then the first GMVD candidate is modified.

a. For example, the final MV may be added by a shifting value.

b. For example, the first GMVD candidate may be modified more than once, until it is not same or similar to a second GMVD or GPM candidate.

3. The comparison method may be defined in bullet 2.

2.5. GPM MMVD Megre Index Signalling

The detailed embodiments below should be considered as examples to explain general concepts. These embodiments should not be interpreted in a narrow way. Furthermore, these embodiments can be combined in any manner.

The term 'GPM' may represent a coding method that split one block into two or more partition/sub-regions wherein at least one partition/sub-region is non-rectangular, or non-square, or it couldn't be generated by any of existing partitioning structure (e.g., QT/BT/TT) which splits one block into multiple rectangular sub-regions. In one example, for the GPM coded blocks, one or more weighting masks are derived for a coding block based on how the sub-regions are split, and the final prediction signal of the coding block is generated by a weighted-sum of two or more auxiliary prediction signals associated with the sub-regions.

The term 'GPM' may indicate the geometric merge mode (GEO), and/or geometric partition mode (GPM), and/or wedge prediction mode, and/or triangular prediction mode (TPM), and/or a GPM block with motion vector difference (GMVD), and/or a GPM block with motion refinement, and/or any variant based on GPM.

The term 'block' may represent a coding block (CB), a CU, a PU, a TU, a PB, a TB.

The phrase "normal/regular merge candidate" may represent the merge candidates generated by the extended merge prediction process (as illustrated in section 3.1). It may also represent any other advanced merge candidates except GEO merge candidates and subblock based merge candidates.

Note that a part/partition of a GPM/GMVD block means a part of a geometric partition in the CU, e.g., the two parts of a GPM block in FIG. 10 are split by a geometrically located straight line. Each part of a geometric partition in the CU is inter-predicted using its own motion, but the transform is performed for the whole CU rather than each part/partition of a GPM block. It is noticed that "one set of motion information associated with one part" of a GPM coded block is used in the following descriptions, even though the motion information of one part may be also applied to the other part due to weighting masks. It could be interpreted that multiple (denoted by K) motion candidate indices for a GPM coded blocks with K parts.

It should also be noticed that GPM/GMVD applied to other modes (e.g., AMVP mode) may also use the following methods wherein the merge candidate list may be replaced by an AMVP candidate list.

1. In one example, the motion information of multiple parts of a video unit may be derived from the same merge candidate.

a. In one example, the two pieces of motion information of two parts may be the same.

1) In one example, list X (e.g., X=0 or 1) motion information is used for the two parts.

b. In one example, the two pieces of motion information of two parts may be derived from the same merge candidate, but the two pieces of motion information may be different.

1) In one example, list X motion information is used for one of the two parts, and list Y motion information is used for the other part.

c. In one example, the video unit may be partitioned by a GPM mode without MVD.

d. In one example, the video unit may be partitioned by a GPM mode with MVD (e.g., GMVD).

e. In one example, the merge candidate may be a GPM/GMVD merge candidate, or a normal merge candidate, or other extended/advanced merge candidate.

2. In one example, whether the motion information of multiple parts of a video unit is derived from the same merge candidate may be dependent on whether a non-zero motion vector difference is applied to a GPM block.

a. For example, only if GPM with non-zero motion vector difference (e.g., GMVD) is used for a video unit (e.g., video block), the motion information of multiple parts of a video unit is allowed to be derived from the same merge candidate.

b. For example, in case that a video block is coded by GPM without motion vector difference, the motion information of multiple parts of a video unit is not allowed to be derived from the same merge candidate.

c. For example, an indication of whether GMVD is used for a video block may be signalled before the GPM merge candidate index.

1) Alternatively, furthermore, how to signal motion candidate indices (e.g., the GPM merge candidate indices) may dependent on the usage of GMVD.

3. In one example, if the two pieces of motion information of two parts of a GPM block are derived from the same merge candidate, one or more of the following rules may be applied:

a. For example, at least one part of the video block is coded with GPM with MVD.

b. For example, if both parts are coded with GPM with MVD, then the MVD of the two parts are not the same.

c. For example, if both parts are coded with GPM with MVD, then the difference (or absolute difference) between two MVDs of the two parts shall be less than (or beyond) a threshold.

2) For example, adaptive threshold values may be used.

a) For example, the adaptive threshold depends on the size of the current video unit.

b) For example, the adaptive threshold depends on the number of pixels/samples in the current video unit.

3) For example, fixed threshold value may be used.

d. For example, if one of the two parts is coded with GPM with MVD, and the other part is coded with GPM without MVD, then one and only one of the following cases is allowed:

4) Part-0 is coded with GPM without MVD, Part-1 is coded with GPM with MVD.

5) Part-0 is coded with GPM with MVD, Part-1 is coded with GPM without MVD.

4. In one example, a syntax element (e.g., a flag) may be signalled for a video unit (e.g., a video block) specifying whether the motion information of multiple parts of a video unit is derived from the same merge candidate.

a. For example, the video unit may be coded with GPM without MVD.

b. For example, the video unit may be coded with GPM with MVD (e.g., GMVD).

c. For example, the syntax element may be conditionally signaled.

6) It may be based on whether the current video unit is coded with GMVD.

7) It may be based on whether the current video unit is coded with GPM without MVD.

8) It may be based on whether there is at least one part of the video block is coded with motion vector difference (e.g., GMVD, MMVD, MMVD).

a) For example, when part-A (e.g., A=0) uses GMVD and part-B (e.g., B=1) used GPM without MVD, the syntax element is not signalled but inferred to be equal to a value specifying the two pieces of motion information of two parts of the current video unit are derived from difference merge candidates.

9) It may be based on whether the motion vector differences of all parts are the same.

10) It may be based on whether the difference or absolute difference between the two motion vector differences of the two part is within/beyond a threshold.

a) For example, adaptive threshold values may be used.

i. For example, the adaptive threshold depends on the size of the current video unit.

ii. For example, the adaptive threshold depends on the number of pixels/samples in the current video unit.

b) For example, fixed threshold value may be used.

d. For example, the syntax element is coded with context based arithmetic coding.

e. Alternatively, furthermore, how many candidate indices to be coded may depend on the syntax element.

5. It is proposed that at least one of motion candidate indices for a GPM coded block is not present in a bitstream.

a. In one example, a first GPM merge index is signalled for a video block, but the second GPM merge index may be not signalled.

b. For example, the second GPM merge index is not signaled in case it is informed that the two pieces of motion information of two parts of the current video unit are derived from the same merge candidate.

c. For example, there may be only one GPM merge index signaled for the whole video block.

d. For example, how to derive the other GPM merge index may be dependent on whether all parts of the current video unit use same merge candidate.

e. For example, when the other GPM merge index is not present, the other GPM merge index for the other part may be derived from the signalled GPM merge index.

f. For example, when the other GPM merge index is not present, it is inferred to be equal to the first signalled GPM merge index.

6. In one example, the signalling of whether a specified part of a GPM block is coded with MVD may be dependent on whether the motion information of multiple parts of a video unit is derived from the same merge candidate.

a. For example, a syntax element A (e.g., a flag) may be signalled specifying whether a specified part of a GPM block is coded with MVD (e.g., a specified part is GMVD coded).

b. Additionally, the syntax element A may be conditionally signalled based on whether the motion information of multiple parts of a video unit is derived from the same merge candidate.

c. For example, when whether the motion information of all parts of a video unit is derived from the same merge candidate, the syntax element A for a certain part (e.g., the second part) may be not signalled but inferred to be equal to a value specifying this certain part of a GPM block is coded with MVD.

7. In one example, the signaled GPM merge candidates index (e.g., merge_gpm_idx0, merge_gpm_idx1) for all parts (e.g., part0 and part1 of a GPM block) may be used to calculate the motion vectors of the merging candidate X at position Px in the merging candidate list mergeCandList (X=mergeCandList[Px]), where Px indicates the signaled gpm merge candidates index (e.g., merge_gpm_idx0, merge_gpm_idx1).

a. For example, whether the above claim is applied may be always applied for a GPM coded block without MVD.

b. For example, whether the above claim is applied may be always applied for a GMVD coded block.

c. For example, whether the above claim is applied to a GPM or GMVD may be dependent on a condition (e.g., a syntax element).

8. In one example, the binarization process of GPM merge candidate index coding may be the same for all candidates to be coded (e.g., corresponding to multiple parts).

a. For example, during the binarization process, the value of the input parameter (e.g., cMax) for part-0 gpm merge candidate index and the value of the input parameter (e.g., cMax) for part-1 gpm merge candidate index are same (e.g., cMax=MaxNumGpmMergeCand−1, wherein MaxNumGpmMergeCand denotes the maximum allowed number of GPM merge candidates).

9. In one example, even when the maximum number of normal merge candidate is equal to one, the GPM/GMVD may be applied as well.

a. For example, in such case, the GPM enabled/disabled flag may be still signaled at SPS level.

b. For example, in such case, the GPM merge candidate index of a GPM part may be not signalled but inferred to be equal to the GPM merge candidate index of the other GPM part.

c. For example, in such case, the maximum number of GPM merge candidates may be not signalled but inferred to a predefined number (such as one or two).

d. For example, the maximum number of GPM merge candidate may be allowed to be equal to 1, no matter the number of the maximum number of normal merge candidates.

e. For example, the maximum number of GPM merge candidate may be allowed to be greater than the maximum number of normal merge candidates.

f. For example, whether GPM is enabled or not may be not conditioned on whether the maximum number of normal merge candidates is greater than one or two.

11) For example, the indication of maximum GPM merge candidate may be not conditioned on whether the maximum number of normal merge candidates is greater than one or two.

12) For example, the GPM merge candidate index may be not conditioned on whether the maximum number of normal merge candidates is greater than one or two.

13) For example, i) whether GPM is enabled or not, and/or ii) the indication of maximum GPM merge candidate, and/or iii) the GPM merge candidate index, may be conditioned on whether the maximum number of normal merge candidates is greater than zero.

14) For example, i) whether GPM is enabled or not, and/or ii) the indication of maximum GPM merge candidate, and/or iii) the GPM merge candidate index, may be signalled without conditions.

10. It is proposed that the motion information derived from a first merge candidate of a part in a GPM and/or GMVD coded block may be modified if it is the same to the motion information derived from a second merge candidate.

a. For example, the MV may be added by a shifting motion vector such as (dx, dy).

b. For example, the reference index may be changed.

c. The modification process may be invoked iteratively until the motion information derived from a first merge candidate is not the same to to the motion information derived from any merge candidate that is before the first merge candidate.

11. The GPM MMVD offset may be represented by one or more indications.

a. For example, an indication may be a variable.

b. For example, an indication may be a syntax element.

c. For example, the indications of a GPM MMVD offset may be represented by a GMVD index.

a. For example, a GPM MMVD offset may be derived by indexing from a GPM MMVD table.

b. For example, the GPM MMVD table is a one-dimensional table with GMVD index as input and GMVD offset as output.

c. For example, the GMVD index can be interpreted to a GMVD direction index and a GMVD distance/step index, by a conversation (e.g., as following examples, wherein NUM_TOTAL_DIR denotes the number of GPM MMVD directions supported in the video unit, and NUM_TOTAL_STEP denotes the number of GPM MMVD steps/distances supported in the video unit)

i. For example, gmvdIdx=gmvdStepIdx*NUM_TOTAL_DIR+gmvdDirIdx ii. For example, gmvdIdx (gmvdStepIdx<<log 2(NUM_TOTAL_DIR))+gmvdDirIdx iii. For example, gmvdStepIdx=gmvdIdx>>log 2(NUM_TOTAL_DIR)

iv. For example, gmvdDirIdx=gmvdIdx−(gmvdStepIdx<<log 2(NUM_TOTAL_DIR))

v. For example, gmvdIdx=gmvdDirIdx*NUM_TOTAL_STEP+gmvdStepIdx d. For example, the indications of a GPM MMVD offset may be represented by an MMVD direction index plus an MMVD step/distance index.

a. For example, a GPM MMVD offset may be derived based on indexing from more than one GPM MMVD tables, for example indexing by the MMVD direction index and the MMVD step/distance index, respectively.

b. For example, the MMVD direction index may be signalled as a syntax element.

c. For example, the MMVD step/distance index may be signalled as a syntax element.

12. The signaling of indications of GMVD information may be before the signaling of the indications of GPM information.

a. For example, the GPM information may be the split direction of the GPM coded block.

b. For example, the GPM information may be the GPM merge index of a geometric partition of a GPM coded block.

c. For example, the GPM information may be the GPM merge index(es) of both geometric partitions of a GPM coded block.

d. For example, the GMVD information may be the GMVD flag for the whole GPM coded block.

e. For example, the GMVD information may be the GMVD flag for a geometric partition of a GPM coded block.

f. For example, the GMVD information may be the GMVD flags for both geometric partitions of a GPM coded block.

g. For example, the signalling of the indications of the GPM MMVD offset may be before the split direction of the GPM coded block.

h. Alternatively, the signaling of indications of GMVD information may be after the signaling of indications of the GPM information.

i. Alternatively, the signaling of indications of GMVD information may be interlaced with the signaling of indications of the GPM information.

a. For example, one or more indications of GPM information may be firstly signalled, followed by one or more indications of GMVD information, and then followed by one or more indications of GPM information again, and so on.

b. For example, one or more indications of GMVD information may be firstly signalled, followed by one or more indications of GPM information, and then followed by one or more indications of GMVD information again, and so on.

13. The signalling and/or usage of GPM merge candidates index (e.g., merge_gpm_idx0, merge_gpm_idx1) may be dependent on whether or not GPM MMVD is used in a coding block.

a. For example, based on a rule, two GPM merge candidate indexes may be signalled for the two geometric partitions.

b. Furthermore, based on a rule, two GPM merge candidate indexes may be signalled for the two geometric partitions, even if the maximum number of GPM merge candidates is equal to T (such as T=2). For example, based on a rule, the binarization of the two GPM merge candidate indexes may be same.

a. For example, both use truncated binary coding with same cMax value, such as cMax=MaxNumGpmMergeCand−K (such as K=1).

b. For example, both use fixed length coding with same cMax value, such as cMax=MaxNumGpmMergeCand−K (such as K=1).

c. For example, based on a rule, the signaled GPM merge candidates index (e.g., merge_gpm_idx0, merge_gpm_idx1) for both parts (e.g., part 0 and part 1 of a GPM block) may be directly used to calculate the motion vectors of the merging candidate X at position Px in the merging candidate list mergeCandList (X=mergeCandList[Px]), where Px indicates the signaled gpm merge candidates index (e.g., merge_gpm_idx0, merge_gpm_idx1).

d. For example, the above rule may be: at least one the followings conditions is satisfied.

a. For example, at least one geometric partition uses GPM MMVD.

b. For example, one geometric partition uses GPM MMVD, and the other geometric partition uses GPM without MMVD.

c. For example, if both geometric partitions use GPM MMVD, the GMVD indexes (and/or GMVD step indexes, and/or GMVD direction indexes, and/or GMVD distance indexes) of the two geometric partitions are different.

d. For example, if both geometric partitions use GPM MMVD, the GMVD offsets of the two geometric partitions are different.

e. For example, if both geometric partitions use GPM MMVD, the difference of the GMVD offsets (and/or GMVD indexes, and/or GMVD step indexes, and/or GMVD direction indexes, and/or GMVD distance indexes) of the two geometric partitions is greater than a threshold.

14. It is proposed that GPM MMVD may be harmonized with template-matching-based GPM.

a. In one example, template-matching-based GPM may be disabled for a block if GPM MMVD is used.

b. In one example, template-matching-based GPM may be disabled for a partition if GPM MMVD is used and the MVD for the partition is not equal to zero.

c. In one example, template-matching-based GPM may be used for a block if GPM MMVD is used.

a. In one example, the MVD signaled by GPM-MMVD may be added to the MV of a partition first and then the resulted MV is further refined by template-matching-based GPM.

b. In one example, the MV of a partition may be refined by template-matching-based GPM first, then the MVD signaled by GPM-MMVD may be further added to the refined MV.

15. In one example, only X-mode coded neighboring reconstructed samples can be used to construct the template for the template matching based motion vector refinement.

a. For example, X indicates INTER mode.

b. For example, X indicates INTRA mode.

c. For example, X indicates INTRA mode or INTER mode.

d. For example, the above template generation is for the template in the current picture.

e. For example, the above template generation is for the template in the current picture, and the template in the reference picture is generated based on the current picture template sample positions.

3. Problems

There are several issues in the existing video coding techniques, which would be further improved for higher coding gain.

1) More efficient prediction list pruning and filling methods may be designed for inter prediction.

2) MMVD and template matching may be concatenated designed during a video unit prediction process, for higher coding gain.

4. Embodiment

The detailed embodiments below should be considered as examples to explain general concepts. These embodiments should not be interpreted in a narrow way. Furthermore, these embodiments can be combined in any manner.

The term 'GPM' may represent a coding method that split one block into two or more partition/sub-regions wherein at least one partition/sub-region is non-rectangular, or non-square, or it couldn't be generated by any of existing partitioning structure (e.g., QT/BT/TT) which splits one block into multiple rectangular sub-regions. In one example, for the GPM coded blocks, one or more weighting masks are derived for a coding block based on how the sub-regions are split, and the final prediction signal of the coding block is generated by a weighted-sum of two or more auxiliary prediction signals associated with the sub-regions.

The term 'GPM' may indicate the geometric merge mode (GEO), and/or geometric partition mode (GPM), and/or wedge prediction mode, and/or triangular prediction mode (TPM), and/or a GPM block with motion vector difference (GMVD), and/or a GPM block with motion refinement, and/or any variant based on GPM.

The term 'block' may represent a coding block (CB), a CU, a PU, a TU, a PB, a TB.

It should also be noticed that GPM/GMVD applied to other modes (e.g., AMVP mode) may also use the following methods wherein the merge candidate list may be replaced by an AMVP candidate list.

The phrase "normal/regular merge candidate" may represent the merge candidates generated by the extended merge prediction process (as illustrated in section 2.1.1). It may also represent any other advanced merge candidates except GPM merge candidates and subblock based merge candidates.

The term "TM" may refer to a template-based methodology which uses at least one template in the current picture and/or the reference picture. In one example, a template may comprise reconstructed/predicted samples neighboring to the current video unit. In another example, a template may comprise reconstructed/predicted samples neighboring to the reference video unit. A template cost may be determined by comparing the difference/error/distortion between a current template and a reference template. A template matching/refinement may be performed based on the template cost.

The term "pruning/prune" in this disclosure may refer to a redundancy check of two candidates, such as during the motion candidate list (e.g., merge list, AMVP list, GPM list, TM list and etc.) construction process. For example, before inserting a new candidate to the motion candidate list, the new candidate is compared with at least one of the existing candidates in the motion candidate list, and only if certain conditions (e.g., motion/reference index is somehow different from the existing candidate, and etc.) are satisfied, the new candidate would be finally inserted to the motion candidate list.

The term "prediction list" in this disclosure may refer to a certain or whatever prediction list comprising more than one motion candidates for video coding procedure, such as GPM candidate list, MHP prediction list for additional hypothesis, MHP base hypothesis candidate list, TM prediction list, DMVR prediction list, BDMVR prediction list, affine AMVP list, affine merge list, regular merge list, regular AMVP list, sbTMVP prediction list, and etc.

In the following discussion, a "new candidate" may refer to a candidate that is considered to be inserted into the candidate list during the candidate list construction procedure. An "existing candidate" may refer to a candidate that is already in the candidate list during the candidate list construction procedure.

1. In one example, during the process of a prediction list generation/construction, whether to insert a new motion candidate to the list may be dependent on a comparison between itself and at least one existing candidate in the prediction list.

a. For example, regarding the determination of whether to insert the new motion candidate to the prediction list, the new motion candidate may be compared with all existing candidates in the prediction list.

b. For example, regarding the determination of whether to insert the new motion candidate to the prediction list, the new motion candidate may be first compared with at most Y (Y is a pre-defined value, such as X=1 or 2) existing candidates at certain pre-defined positions in the prediction list.

a. For example, the certain pre-defined positions may be at most Y candidates from the end of the prediction list.

b. For example, the certain pre-defined positions may be the first and third candidates from the end of the prediction list.

c. For example, the certain pre-defined position may be the second candidate from the end of the prediction list.

d. For example, the certain pre-defined position may be the first candidate from the end of the prediction list.

c. For example, when comparing the new candidate with an existing candidate in the prediction list, identical check may be applied.

a. For example, when comparing the new candidate with an existing candidate in the prediction list, motion vector identical check may be applied.

i. For example, if the motion vector of the new candidate and the existing candidate in the prediction list are identical (both horizontal and vertical components of motion vectors are the same, both L0 motion and L1 motion are the same), the new candidate may not be inserted to the prediction list.

b. For example, when comparing the new candidate with an existing candidate in the prediction list, reference index identical check may be applied.

i. For example, if the reference index of the new candidate and the existing candidate in the prediction list are identical (both L0 motion and L1 motion are the same), the new candidate may not be inserted to the prediction list.

c. For example, when comparing the new candidate with an existing candidate in the prediction list, BCW index check may be applied.

d. For example, when comparing the new candidate with an existing candidate in the prediction list, LIC flag check may be applied.

e. For example, when comparing the new candidate with an existing candidate in the prediction list, OBMC flag check may be applied.

f. For example, when comparing the new candidate with an existing candidate in the prediction list, motion vector precision (e.g., $\frac{1}{16}$-pel, $\frac{1}{8}$-pel, $\frac{1}{4}$-pel, $\frac{1}{2}$-pel, 1-pel, 4-pel precision, and etc) check may be applied.

g. For example, when comparing the new candidate with an existing candidate in the prediction list, interpolation filter (e.g., half-pel interpolation filter, and etc) check may be applied.

h. For example, when both the above conditions are satisfied, the new candidate may not be inserted to the prediction list.

i. For example, a first piece of side information may or may NOT be considered to determine whether two candidates are identical or not.

i. In one example, the first piece of side information may be the BCW index.

ii. In one example, the first piece of side information may be the LIC flag.

d. For example, when comparing the new candidate with an existing candidate in the prediction list, one or more thresholds may be used to determine how different they are.

a. For example, a first threshold may be used to determine the allowed motion vector difference for the candidates.

i. In one example, if the absolute MV difference of two candidates is smaller or no greater than the threshold, the two candidates are treated as identical.

b. For example, a second threshold may be used to determine the reference index difference of the candidates.

c. For example, a threshold may be signaled from the encoder to the decoder.

d. For example, the threshold may be dependent on decoded information.

e. In one example, the decoded information may comprise the motion vector precision of a motion candidate.

i. In one example, the decoded information may comprise BCW information.

ii. In one example, the decoded information may comprise LIC information.

iii. In one example, the decoded information may comprise motion compensation interpolation filter information.

iv. In one example, the decoded information may comprise OBMC information.

v. For example, the decoded information may comprise the width and/or height of the coding unit.

vi. For example, the decoded information may comprise types of prediction list generations. In one example, the difference check threshold for prediction list A generation may be different from that used for prediction list B generation, wherein A and B are two prediction list types.

vii. For example, the difference check threshold for prediction list A generation may be same as the difference check threshold for prediction list B generation, wherein A and B are two prediction list types. Additionally, the whole difference check procedure (more than the threshold) for prediction list A generation may be same as the difference check threshold for prediction list B generation. For example, A or B may be GPM candidate list generation.

For example, A or B may be MHP prediction list generation for additional hypothesis.

For example, A or B may be MHP base hypothesis candidate list generation.

For example, A or B may be TM candidate list generation.

For example, A or B may be DMVR candidate list generation.

For example, A or B may be BDMVR candidate list generation.

For example, A or B may be Affine AMVP candidate list generation.

For example, A or B may be Affine merge candidate list generation.

For example, A or B may be regular merge candidate list generation.

For example, A or B may be regular AMVP candidate list generation.

For example, A or B may be SbTMVP candidate list generation.

2. In one example, how to perform pruning process during the determination of inserting a new candidate to a prediction list, may be dependent on the coded/decoded information.

a. For example, whether to use pruning process may be dependent on the reference picture list information.

a. For example, if the reference picture information (e.g., POC distance, reference index, and etc) in list0 and list1 are referring to a same reference picture, then pruning process may be not applied to the latter candidate.

i. Additionally, the latter candidate may be not inserted to the prediction list.

b. For example, the prediction list refers to uni-directional prediction list (e.g., GPM list, MHP prediction list for additional hypothesis generation).

c. For example, the prediction list refers to bi-directional prediction list.

d. For example, the prediction list may comprise both uni-directional and bi-directional candidates.

b. For example, whether to use identical motion vector check (e.g., bullet 1. d) or threshold-based motion vector check (e.g., bullet 1. e), may be dependent on the reference picture list information.

a. In one example, if all reference pictures in list 0 and list 1 are the same, the identical motion vector check may be applied.

b. In one example, if all reference pictures in list 0 and list 1 are the same, the identical threshold-based motion vector check may be applied.

c. In one example, if at least one of the reference pictures in list 0 and list 1 are different, the identical motion vector check may be applied.

d. In one example, if at least one of the reference pictures in list 0 and list 1 are different, the identical threshold-based motion vector check may be applied.

3. In one example, one or more generated candidates may be appended at the end of a prediction list until the prediction list is full.

a. For example, the prediction list is a GPM prediction list.

b. For example, the prediction list is a MHP prediction list for additional hypothesis generation.

c. For example, how many candidates to be appended to a prediction list may be dependent on the maximum allowed length of the prediction list.

a. For example, the maximum allowed length of a prediction list may be pre-defined.

b. For example, the maximum allowed length of a prediction list may be signalled in the bitstream.

d. For example, if the number of candidates (e.g., after pruning) is less than the maximum allowed length of the prediction list, then additional candidates may be inserted to the prediction list, until the number of candidates reach the maximum length of the prediction list.

e. For example, the additional candidates may be generated by averaging certain available candidates in the list.

a. Additionally, the pruning process may be applied to averaged candidates.

b. alternatively, the pruning process may not be applied to averaged candidates.

c. The process of "averaging" on candidates may comprise an averaging process on MVs of the candidates.

f. For example, the additional candidates may be zero motion candidates.

a. For example, zero motion candidates may be appended at the end of the prediction list.

b. Additionally, the pruning process may not be applied to zero motion candidates at the end of the list.

g. Alternatively, one or more generated candidates may be appended at the end of a prediction list, and the prediction list after filling may be not full.

a. For example, a fixed number of averaged candidates may be inserted to the prediction list.

b. For example, a fixed number of zero motion candidates may be inserted to the prediction list.

4. In one example, in case that a template matching based motion refinement is applied to GPM (or, CIIP, MHP additional hypothetic, and etc) motion candidates, the above pruning process (bullet 1 to 4) may be applied to the accordingly template matching based prediction list generation.

5. In one example, in case that a template matching based motion refinement is applied to GPM (or, CIIP, MHP additional hypothetic, and etc) motion candidates, a candidate reordering process may be applied during the template matching based GPM list generation.

a. For example, the candidate reordering process may be based on a criterion, wherein the cost value of each candidate may be evaluated from current picture neighboring samples information and/or reference picture reference samples information.

b. For example, the candidate reordering process may be applied before the pruning process.

c. For example, the candidate reordering process may be applied after the pruning process.

6. In one example, a decoder-side motion refinement approach, e.g template-matching-based (TM-based) motion refinement, and a motion-vector-difference-based (MMVD-based) method may be applied to a video unit. In the following discussion, TM-based method may be replaced by any other decoder-side motion refinement approach.

a. For example, the TM-based method may refer that the motion predictor/candidate of the video unit is refinement (e.g., implicitly refined at the decoder side) by a TM-based method.

b. For example, the MMVD-based method may refer that a motion vector difference is explicitly signalled and add up to a motion predictor/candidate of the video unit.

c. For example, both TM-based method and MMVD-based method may be allowed for a GPM coded video unit.

d. For example, both TM-based method and MMVD-based method may be allowed for a CIIP coded video unit.

e. For example, both TM-based method and MMVD-based method may be allowed for a MHP coded video unit (e.g., base hypothesis, and/or additional hypothesis).

f. For example, both TM-based method and MMVD-based method may be allowed for a regular merge coded video unit.

g. For example, TM-based method related syntax elements may be signalled after the MMVD-based method related syntax elements.

a. For example, whether and how to signal TM related syntax elements, may be dependent on MMVD information.

i. For example, the MMVD information may refer to MMVD offset value.

ii. For example, TM related syntax elements may be signalled for a coding unit, under the condition that zero MMVD offset is applied to the video unit.

iii. For example, TM related syntax elements may be signalled for a partition/subpartition/subblock of a coding unit (e.g., GPM coded block), under the condition that zero MMVD offset is applied to the specific partition/subpartition/subblock of the coding unit.

iv. For example, TM related syntax elements may be signalled for a coding unit, under the condition that all partitions/subpartitions/subblocks (e.g., GPM coded block) of a coding unit are coded with zero MMVD offset.

b. In one example, TM related syntax elements may be signalled for a video unit, even though MMVD related syntax elements are signalled.

i. In one example, the MVD signaled by the MMVD method may be added to the MV of the video unit first and then the resulted MV is further refined by a template-matching-based method.

c. For example, if TM related syntax elements are not signalled, they may be inferred to certain values (indicating that TM-based method is not applied to the video unit).

h. For example, TM-based method related syntax elements may be signalled before the MMVD-based method related syntax elements.

a. For example, whether and how to signal MMVD related syntax elements, may be dependent on whether TM is applied to the video unit.

i. For example, MMVD related syntax elements may be signalled for a coding unit, under the condition that TM based method is not used to the video unit.

ii. For example, MMVD related syntax elements may be signalled for a partition/subpartition/subblock of a coding unit (e.g., GPM coded block), under the condition that TM is NOT applied to the specific partition/subpartition/subblock of the coding unit.

iii. For example, MMVD related syntax elements may be signalled for a coding unit, under the condition that all partitions/subpartitions/subblocks (e.g., GPM coded block) of a coding unit are NOT coded with TM.

b. In one example, MMVD related syntax elements may be signalled for a video unit, even though TM related syntax elements are signalled.

i. In one example, the MV of a partition may be refined by a template-matching-based method first, then the MVD signaled by the MMVD method may be further added to the refined MV.

c. For example, if MMVD related syntax elements are not signalled, they may be inferred to certain values (indicating that MMVD-based method is not applied to the video unit).

i. For example, the above-mentioned TM-based method related syntax elements may refer to a TM flag for an entire video unit, and/or separate TM flags for separate partitions/subpartitions/subblocks of a video unit, and/or TM based merge/AMVP candidate index, and etc.

j. For example, the above-mentioned MMVD-based method related syntax elements may refer to a MMVD flag for an entire video unit, and/or separate MMVD flags for separate partitions/subpartitions/subblocks of a video unit, and/or MMVD based merge candidate index, and/or MMVD offset direction, and/or MMVD offset distance/step, and etc.

k. In one example, the TM-based method may be applied before the MMVD process. The motion vector may be first refined by the TM-based method, then added by a signaled MVD.

l. In one example, the TM-based method may be applied after the MMVD process. The motion vector may be first added by a signaled MVD, then refined by the TM-based method.

7. In one example, in case that an explicit motion refinement and/or an implicit motion refinement are allowed to be used to a video unit (where the video unit contains more than one subblock/subpartition/partition), the motion candidate (e.g., merge index) of a first subblock/subpartition/partition and the motion candidate of a second subblock/subpartition/partition of the video unit may NOT be allowed to be same (e.g., different motion candidates should be used for at least two partitions of a video unit).

a. Alternatively, under such case, the motion candidate of a first subblock/subpartition/partition and the motion candidate of a second subblock/subpartition/partition of the video unit may be allowed to be same (e.g., same motion candidates are allowed for all partitions of a video unit).

b. For example, the motion candidate of an implicit motion refinement for a first subblock/subpartition/partition and the motion candidate of an implicit motion refinement for a second subblock/subpartition/partition of the video unit may NOT be allowed to be same.

a. Alternatively, the motion candidate of an implicit motion refinement for a first subblock/subpartition/partition and the motion candidate of an implicit motion refinement for a second subblock/subpartition/partition of the video unit may be allowed to be same.

c. For example, the motion candidate of an explicit motion refinement for a first subblock/subpartition/partition and the motion candidate of an explicit motion refinement for a second subblock/subpartition/partition of the video unit may be allowed to be same.

a. Alternatively, the motion candidate of an explicit motion refinement for a first subblock/subpartition/partition and the motion candidate of an explicit motion refinement for a second subblock/subpartition/partition of the video unit may NOT be allowed to be same.

d. For example, when motion candidates of two subblocks/subpartitions/partitions of a video unit is allowed to be same, a. Same motion candidates may be used for all subblocks/subpartitions/partitions of a video unit.

b. Same motion candidates may be used for at least two subblocks/subpartitions/partitions of a video unit.

c. Motion candidate index of at least one subblock/subpartition/partition of the video block may be NOT signalled but inferred.

d. The number of signalled motion candidate index may be less than the number of subblocks/subpartitions/partitions of the video unit.

i. For example, only one motion candidate index of a specific prediction method may be signalled for the entire video unit.

e. Whether to signal or infer a motion candidate index may be dependent on a syntax element i. For example, a syntax flag indicating whether same candidate is used for all subblocks/subpartitions/partitions of the video unit).

ii. For example, a syntax parameter indicating whether same candidate is used for the specified subblocks/subpartitions/partitions of the video unit.

f. The motion candidate index of each subblock/subpartition/partition may be signaled independently (e.g., without depending on each other).

e. For example, when motion candidates of two subblocks/subpartitions/partitions of a video unit are required to be different, a. Same motion candidate is NOT allowed for different subblocks/subpartitions/partitions of a video unit.

b. The motion candidate index of each subblock/subpartition/partition may be signaled independently (e.g., without depending on each other).

c. The coded/signalled value of the motion candidate index of a second subblock/subpartition/partition may be less then the motion candidate index used in the decoding process.

i. How to covert a motion candidate index (in the decoding process) to a signalled motion candidate index (coded in the bitstream) may be dependent on the relationship between the motion candidate index of the first subblock/subpartition/partition and the motion candidate index of the second subblock/subpartition/partition.

f. For example, the above mentioned "implicit motion refinement" may refer to TM-based method, or any other decoder-side motion refinement approach.

g. For example, the above mentioned "explicit motion refinement" may refer to a motion-vector-difference-based (MMVD-based) method, or any other motion refinement approach that explicitly signal the motion difference information from encoder to decoder.

1. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

1) For example, the disclosed methods may refer to template-matching-based (TM-based) motion refinement for GPM (or CIIP, or MHP, and etc.).

2) For example, the disclosed methods may refer to motion-vector-difference-based (MMVD-based) method for GPM (or CIIP, or MHP, and etc.).

3) For example, the presence of the signalled syntax elements may be dependent on the width and/or height of the picture/slice.

2. Whether to and/or how to apply the disclosed methods above may be signalled at PB/TB/CB/PU/TU/CU/VPDU/CTU/CTU row/slice/tile/sub-picture/other kinds of region contain more than one sample or pixel.

3. Whether to and/or how to apply the disclosed methods above may be dependent on coded information, such as block size, colour format, single/dual tree partitioning, colour component, slice/picture type.

The embodiments of the present disclosure are related to pruning of prediction list and concatenation of MMVD and template matching. As used herein, the term "GPM" may represent a coding method that split one block into two or more partition/sub-regions. The at least one partition/sub-region is non-rectangular, or non-square, or it couldn't be generated by any of existing partitioning structure (e.g., QT/BT/TT) which splits one block into multiple rectangular sub-regions. In one example, for the GPM coded blocks, one or more weighting masks are derived for a coding block based on how the sub-regions are split, and the final prediction signal of the coding block is generated by a weighted sum of two or more auxiliary prediction signals associated with the sub-regions. The term "GPM" may indicate at least one of the geometric merge mode (GEO), geometric partition mode (GPM), wedge prediction mode, triangular prediction mode (TPM), a GPM block with motion vector difference (GMVD), a GPM block with motion refinement, or any variant based on GPM. Moreover, the term "block" may represent a coding tree block (CTB), a coding tree unit (CTU), a coding block (CB), a coding unit (CU), a prediction unit (PU), a transform unit (TU), a prediction block (PB), a transform block (TB), a video processing unit comprising multiple samples/pixels, and/or the like. A block may be rectangular or non-rectangular.

Figure 13:
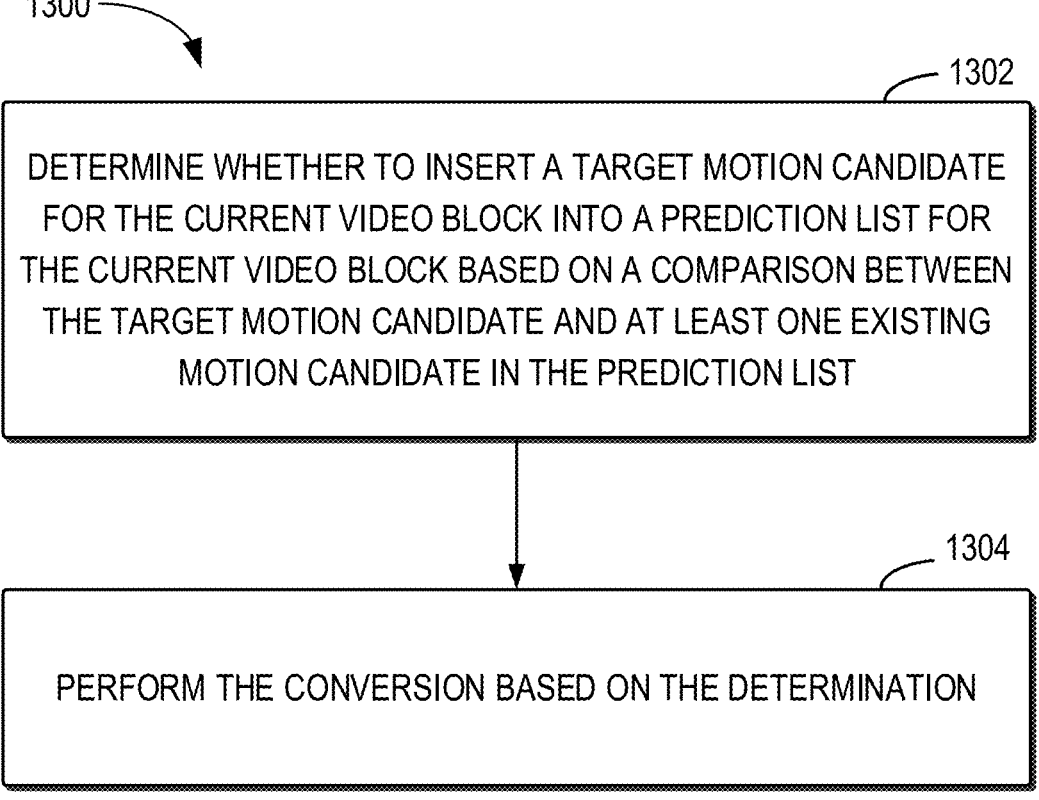
FIG. 13 illustrates a flowchart of a method for video processing in accordance with some embodiments of the present disclosure.

FIG. 13 illustrates a flowchart of a method 1300 for video processing in accordance with some embodiments of the present disclosure. The method 1300 may be implemented during a conversion between a current video block of a video and a bitstream of the video. As shown in FIG. 13, the method 1300 starts at 1302 where whether to insert a target motion candidate for the current video block into a prediction list for the current video block is determined based on a comparison between the target motion candidate and at least one existing motion candidate in the prediction list. By way of example, the target motion candidate may be compared with an existing motion candidate located at the end of the prediction list. If the target motion candidate is determined to be identical with the existing motion candidate, the target motion candidate may be determined to be discarded, that is, the target motion candidate may not be inserted into the prediction list. If the target motion candidate is determined to be different from the existing motion candidate, the target motion candidate may be inserted into the prediction list. It should be understood that the above illustrations and/or examples are described merely for purpose of description. The scope of the present disclosure is not limited in this respect.

At 1304, the conversion is performed based on the above determination. In some embodiments, the conversion may include encoding the current video block into the bitstream. Alternatively or additionally, the conversion may include decoding the current video block from the bitstream.

According to the method 1300, a target motion candidate is compared with at least one existing motion candidate in the prediction list to determine whether to insert the target motion candidate into the prediction list. Thereby, the proposed solution can advantageously prune and fill the prediction list more efficiently, and thus the coding efficiency may be improved.

In some embodiments, the prediction list may comprise one of: a geometric partition mode (GPM) candidate list, a multi-hypothesis prediction (MHP) base hypothesis candidate list, a template matching (TM) candidate list, a decoder-side motion vector refinement (DMVR) candidate list, a block-based decoder-side motion vector refinement (BDMVR) candidate list, a multi-pass decoder-side motion vector refinement (MPDMVR) candidate list, or a regular advanced motion vector prediction (AMVP) candidate list. It should be understood that the possible implementations of the prediction list described here are merely illustrative and therefore should not be construed as limiting the present disclosure in any way.

In some embodiments, the at least one existing motion candidate may comprise all the existing motion candidates in the prediction list. That is, the target motion candidate may be compared with each existing motion candidate in the prediction list, so as to determine whether the target motion candidate is to be inserted into the prediction list. Thereby, it is possible to reduce redundancy in the prediction list, and the coding efficiency can be improved.

In some embodiments, the target motion candidate may be compared with a set of existing motion candidates at predefined positions in the prediction list, and the number of existing motion candidates contained in the set of existing motion candidates may be less than or equal to a pre-defined value. In one example, the set of existing motion candidates may be located at the end of the prediction list. In another example, the set of existing motion candidates may comprise existing motion candidates at the first and third positions from the end of the prediction list. Additionally or alternatively, the set of existing motion candidates may comprise an existing motion candidate at the second position from the end of the prediction list. In yet another embodiment, the set of existing motion candidates may comprise an existing motion candidate at the end of the prediction list. It should be understood that the above illustrations and/or examples are described merely for purpose of description. The scope of the present disclosure is not limited in this respect.

In some embodiments, at 1302, whether the target motion candidate and a first existing motion candidate of the at least one existing motion candidate are identical is determined. If the target motion candidate and the first existing motion candidate are identical, it may be determined that the target motion candidate is not inserted into the prediction list.

In some embodiments, at 1302, whether a motion vector (MV) for the target motion candidate and a MV for the first existing motion candidate are identical is determined. If the MV for the target motion candidate and the MV for the first existing motion candidate are identical, it may be determined that the target motion candidate and the first existing motion candidate are identical. In one example, if a horizontal component of the MV for the target motion candidate and a horizontal component of the MV for the first existing motion candidate are identical and a vertical component of the MV for the target motion candidate and a vertical component of the MV for the first existing motion candidate are identical, it may be determined that the MV for the target motion candidate and the MV for the first existing motion candidate are identical. It should be understood that the above illustrations and/or examples are described merely for purpose of description. The scope of the present disclosure is not limited in this respect.

In some embodiments, at 1302, whether a reference index for the target motion candidate and a reference index for the first existing motion candidate are identical is determined. If the reference index for the target motion candidate and the reference index for the first existing motion candidate are identical, it may be determined that the target motion candidate and the first existing motion candidate are identical.

In some embodiments, at 1302, whether a bi-prediction with CU-level weight (BCW) index for the target motion candidate and a BCW index for the first existing motion candidate are identical is determined. If the BCW index for the target motion candidate and the BCW index for the first existing motion candidate are identical, it may be determined that the target motion candidate and the first existing motion candidate are identical.

In some embodiments, at 1302, whether a local illumination compensation (LIC) flag for the target motion candidate and a LIC flag for the first existing motion candidate are identical is determined. If the LIC flag for the target motion candidate and the LIC flag for the first existing motion candidate are identical, it may be determined that the target motion candidate and the first existing motion candidate are identical.

In some embodiments, at 1302, whether an overlapped block motion compensation (OBMC) flag for the target motion candidate and an OBMC flag for the first existing motion candidate are identical. If the OBMC flag for the target motion candidate and the OBMC flag for the first existing motion candidate are identical, it may be determined that the target motion candidate and the first existing motion candidate are identical.

In some embodiments, at 1302, whether a motion vector precision for the target motion candidate and a motion vector precision for the first existing motion candidate are identical is determined. If the motion vector precision for the target motion candidate and the motion vector precision for the first existing motion candidate are identical, it may be determined that the target motion candidate and the first existing motion candidate are identical.

In some embodiments, at 1302, whether an interpolation filter for the target motion candidate and an interpolation filter for the first existing motion candidate are identical is determined. If the interpolation filter for the target motion candidate and the interpolation filter for the first existing motion candidate are identical, it may be determined that the target motion candidate and the first existing motion candidate are identical.

In some embodiments, at 1302, if at least two of the following are satisfied, it may be determined that the target motion candidate and the first existing motion candidate are identical: a MV for the target motion candidate and a MV for the first existing motion candidate are identical, a reference index for the target motion candidate and a reference index for the first existing motion candidate are identical, a BCW index for the target motion candidate and a BCW index for the first existing motion candidate are identical, a LIC flag for the target motion candidate and a LIC flag for the first existing motion candidate are identical, an OBMC flag for the target motion candidate and an OBMC flag for the first existing motion candidate are identical, a motion vector precision for the target motion candidate and a motion vector precision for the first existing motion candidate are identical, or an interpolation filter for the target motion candidate and an interpolation filter for the first existing motion candidate are identical.

In some embodiments, whether the target motion candidate and the first existing motion candidate are identical may be determined at 1302 with determining whether a first piece of side information of the target motion candidate and a first piece of side information of the first existing motion candidate are identical. Alternatively, whether the target motion candidate and the first existing motion candidate are identical may be determined at 1302 without determining whether a first piece of side information of the target motion candidate and a first piece of side information of the first existing motion candidate are identical. In one example, the first piece of side information may be a BCW index or a LIC flag. It should be understood that the above illustrations and/or examples are described merely for purpose of description. The scope of the present disclosure is not limited in this respect.

In some embodiments, at 1302, a difference between the target motion candidate and a first existing motion candidate of the at least one existing motion candidate is determined by using at least one threshold. Whether to insert the target motion candidate into the prediction list is determined based on the difference. By way of example, a reference index difference between a reference index for the target motion candidate and a reference index for the first existing motion candidate is determined by using a second threshold of the at least one threshold, so as to determine the difference between the target motion candidate and the first existing motion candidate. Alternatively, a motion vector difference between a MV for the target motion candidate and a MV for the first existing motion candidate is determined by using a first threshold of the at least one threshold, so as to determine the difference between the target motion candidate and the first existing motion candidate. In one example, if an absolute of the motion vector difference is smaller than or equal to the first threshold, it may be determined that the target motion candidate is not inserted into the prediction list. It should be understood that the above illustrations and/or examples are described merely for purpose of description. The scope of the present disclosure is not limited in this respect.

In some embodiments, one of the at least one threshold may be indicated in the bitstream. Alternatively or additionally, one of the at least one threshold may be dependent on coded information of the video. In one example, the coded information may comprise at least one of: a motion vector precision of a motion candidate, BCW information, LIC information, motion compensation interpolation filter information, OBMC information, a width of a coding unit, or a height of the coding unit. Alternatively or additionally, the coded information may comprise types of prediction lists.

In some embodiments, the at least one threshold may comprise a third threshold for generating a first type of prediction list and a fourth threshold for generating a second type of prediction list. The first type of prediction list may be different from the second type of prediction list, and the third threshold may be different from the fourth threshold. Alternatively, the at least one threshold may comprise a third threshold for generating a first type of prediction list and a fourth threshold for generating a second type of prediction list, the first type of prediction list may be different from the second type of prediction list, and the third threshold may be the same as the fourth threshold.

In some embodiments, a difference check procedure for generating the first type of prediction list may be the same as a difference check procedure for generating the second type of prediction list. In one example, the first type of prediction list or the second type of prediction list may be a geometric partition mode (GPM) candidate list. In another example, the first type of prediction list or the second type of prediction list may be a multi-hypothesis prediction (MHP) prediction list for additional hypothesis or a MHP base hypothesis candidate list. In a further example, the first type of prediction list or the second type of prediction list may be a template matching (TM) candidate list. Alternatively, the first type of prediction list or the second type of prediction list may be a decoder-side motion vector refinement (DMVR) candidate list or a block-based decoder-side motion vector refinement (BDMVR) candidate list. In yet another example, the first type of prediction list or the second type of prediction list may be a multi-pass decoder-side motion vector refinement (MPDMVR) candidate list. In another example, the first type of prediction list or the second type of prediction list may be an affine advanced motion vector prediction (AMVP) candidate list or an affine merge candidate list. In one further example, the first type of prediction list or the second type of prediction list may be a regular merge candidate list. In yet another example, the first type of prediction list or the second type of prediction list may be a regular AMVP candidate list. Alternatively, the first type of prediction list or the second type of prediction list may be a subblock-based temporal motion vector prediction (SbTMVP) candidate list.

In some embodiments, how to perform the comparison during the determination of whether to insert the target motion candidate into the prediction list may be dependent on coded information of the video. In one embodiment, the comparison may be dependent on reference picture list information of the target motion candidate. For example, the comparison may be performed if reference picture information in a first reference picture list for the target motion candidate and reference picture information in a second reference picture list for the target motion candidate indicate different reference pictures. Additionally, the target motion candidate may be not inserted into the prediction list. It should be understood that the above illustrations and/or examples are described merely for purpose of description. The scope of the present disclosure is not limited in this respect.

In some embodiments, the prediction list may comprise at least one of: a uni-directional prediction list, or a bi-directional prediction list.

In some embodiments, whether to use identical motion vector check or threshold-based motion vector check may be dependent on reference picture list information of the target motion candidate. In one example, if all of reference pictures in a first reference picture list and a second reference picture list for the target motion candidate are the same, the identical motion vector check may be applied to the target motion candidate. Alternatively, if at least one of reference pictures in a first reference picture list and a second reference picture list for the target motion candidate are different, the identical motion vector check may be applied to the target motion candidate. In another example, if all of reference pictures in a first reference picture list and a second reference picture list for the target motion candidate are the same, the threshold-based motion vector check may be applied to the target motion candidate. Alternatively, if at least one of reference pictures in a first reference picture list and a second reference picture list for the target motion candidate are different, the threshold-based motion vector check may be applied to the target motion candidate.

In some embodiments, at 1304, the prediction list is updated by appending at least one additional candidate for the current video block at the end of the prediction list. The conversion is performed based on the updated prediction list. In one example, the prediction list may be a GPM prediction list. Alternatively, the prediction list may be a MHP prediction list for additional hypothesis generation. It should be understood that the possible implementations of the prediction list described here are merely illustrative and therefore should not be construed as limiting the present disclosure in any way.

In some embodiments, the number of at least one additional candidate may be dependent on the maximum allowed length of the prediction list. In one example, the maximum allowed length of the prediction list may be predefined. Alternatively, the maximum allowed length of the prediction list may be indicated in the bitstream.

In some embodiments, if the number of existing motion candidate in the prediction list is less than the maximum allowed length of the prediction list, the at least one additional candidate may be inserted into the prediction list until the number of existing motion candidate in the prediction list reach the maximum allowed length of the prediction list.

In some embodiments, the at least one additional candidate may be generated by averaging motion candidates in the prediction list. In one example, averaging the motion candidates in the prediction list may comprise an averaging process on MVs of the motion candidates. In one embodiment, the target motion candidate may be inserted into the prediction list with a further comparison with one of the at least one additional candidate. Alternatively, the target motion candidate may be inserted into the prediction list without a further comparison with one of the at least one additional candidate. Thereby, the proposed method can advantageously prune and fill the prediction list more efficiently, In some embodiments, the at least one additional candidate may be zero motion candidate. In such a case, the at least one additional candidate may be appended at the end of the prediction list. In one embodiment, the target motion candidate may be inserted into the prediction list without a further comparison with a zero motion candidate at the end of the prediction list. Thereby, the proposed method can advantageously prune and fill the prediction list more efficiently, In some embodiments, at 1304, the prediction list is updated by appending at least one additional candidate for the current video block at the end of the prediction list. The conversion is performed based on the updated prediction list. In some embodiments, in addition to appending the at least one additional candidate, a fixed number of averaged candidates or a fixed number of zero motion candidates are inserted into the prediction list, so as to update the prediction list.

In some embodiments, the prediction list may comprise template matching based prediction list, if template matching based motion refinement is applied to one of GPM motion candidates, combined intra and inter prediction (CIIP) motion candidates, or MHP additional hypothetic motion candidates.

In some embodiments, a bitstream of a video may be stored in a non-transitory computer-readable recording medium. The bitstream of the video can be generated by a method performed by a video processing apparatus. According to the method, whether to insert a target motion candidate for the current video block into a prediction list for the current video block is determined based on a comparison between the target motion candidate and at least one existing motion candidate in the prediction list. A bitstream of the current video block may be generated based on the determination.

In some embodiments, whether to insert a target motion candidate for the current video block into a prediction list for the current video block is determined based on a comparison between the target motion candidate and at least one existing motion candidate in the prediction list. A bitstream of the current video block may be generated based on the determination. The bitstream may be stored in a non-transitory computer-readable recording medium.

Figure 14:
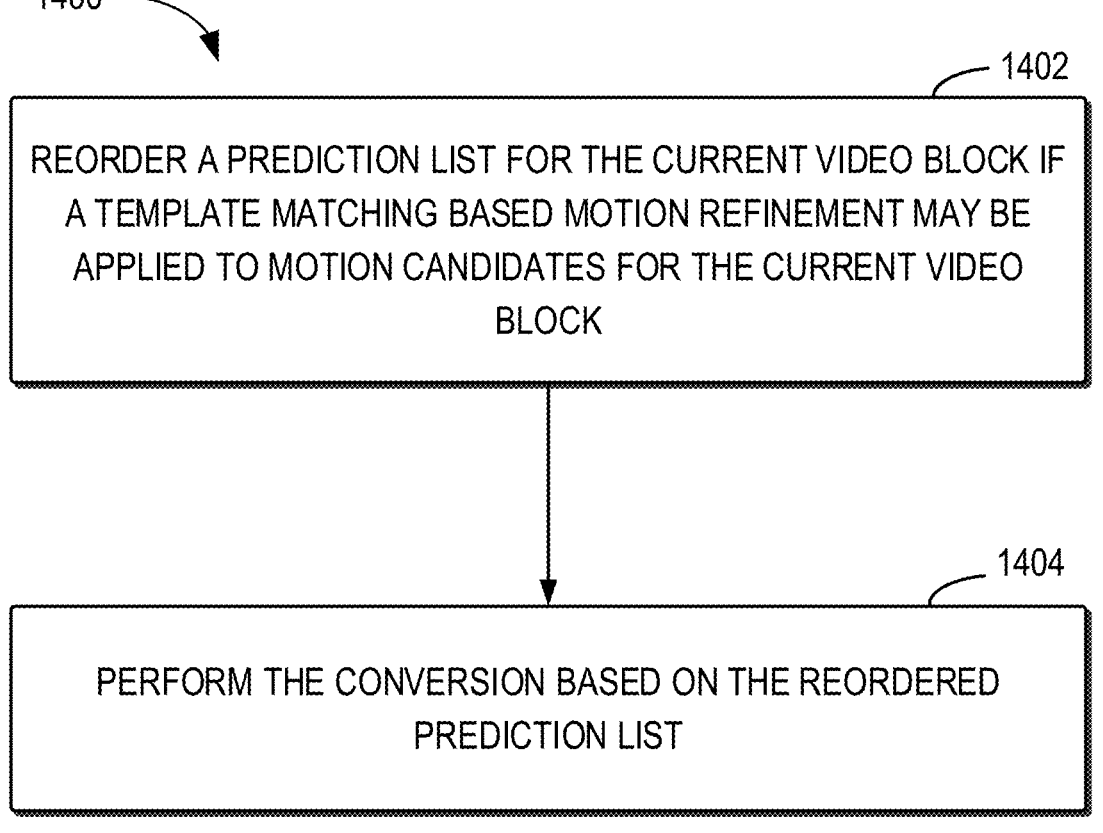
FIG. 14 illustrates a flowchart of another method for video processing in accordance with some embodiments of the present disclosure.

FIG. 14 illustrates another flowchart of a method 1400 for video processing in accordance with some embodiments of the present disclosure. The method 1400 may be implemented during a conversion between a current video block of a video and a bitstream of the video. As shown in FIG. 14, the method 1400 starts at 1402 where a prediction list for the current video block is reordered if a template matching based motion refinement is applied to motion candidates for the current video block. In one example, the motion candidates may be GPM motion candidates. In another example, the motion candidates may be CIIP motion candidates. Alternatively, the motion candidates may be MHP additional hypothetic motion candidates. It should be understood that the possible implementations of the motion candidates described here are merely illustrative and therefore should not be construed as limiting the present disclosure in any way.

At 1404, the conversion is performed based on the reordered prediction list. In some embodiments, the conversion may include encoding the current video block into the bitstream. Alternatively or additionally, the conversion may include decoding the current video block from the bitstream.

According to the method 1400, the prediction list is reordered in case that a template matching based motion refinement is applied. Thereby, the proposed method can advantageously improve the coding efficiency and coding quality.

In some embodiments, the prediction list may be reordered based on a criterion that a cost value of each candidate in the prediction list may be evaluated from at least one of picture neighboring samples information or reference picture reference samples information of the current video block.

In some embodiments, the method 1400 may further comprise: determining, before reordering the prediction list, whether to insert a target motion candidate for the current video block into the prediction list based on a comparison between the target motion candidate and at least one existing motion candidate in the prediction list. By way of example, the candidate reordering process may be applied before the pruning process according to the method 1300. Alternatively, the method 1400 may further comprise: determining whether to insert a target motion candidate for the current video block into the reordered prediction list based on a comparison between the target motion candidate and at least one existing motion candidate in the reordered prediction list. By way of example, the candidate reordering process may be applied after the pruning process according to the method 1300. It should be understood that the above illustrations and/or examples are described merely for purpose of description. The scope of the present disclosure is not limited in this respect.

In some embodiments, a bitstream of a video may be stored in a non-transitory computer-readable recording medium. The bitstream of the video can be generated by a method performed by a video processing apparatus. According to the method, a prediction list for the current video block is reordered if a template matching based motion refinement is applied to motion candidates for the current video block. A bitstream of the current video block may be generated based on the reordered prediction list.

In some embodiments, a prediction list for the current video block is reordered if a template matching based motion refinement is applied to motion candidates for the current video block. A bitstream of the current video block may be generated based on the reordered prediction list. The bitstream may be stored in a non-transitory computer-readable recording medium.

Figure 15:
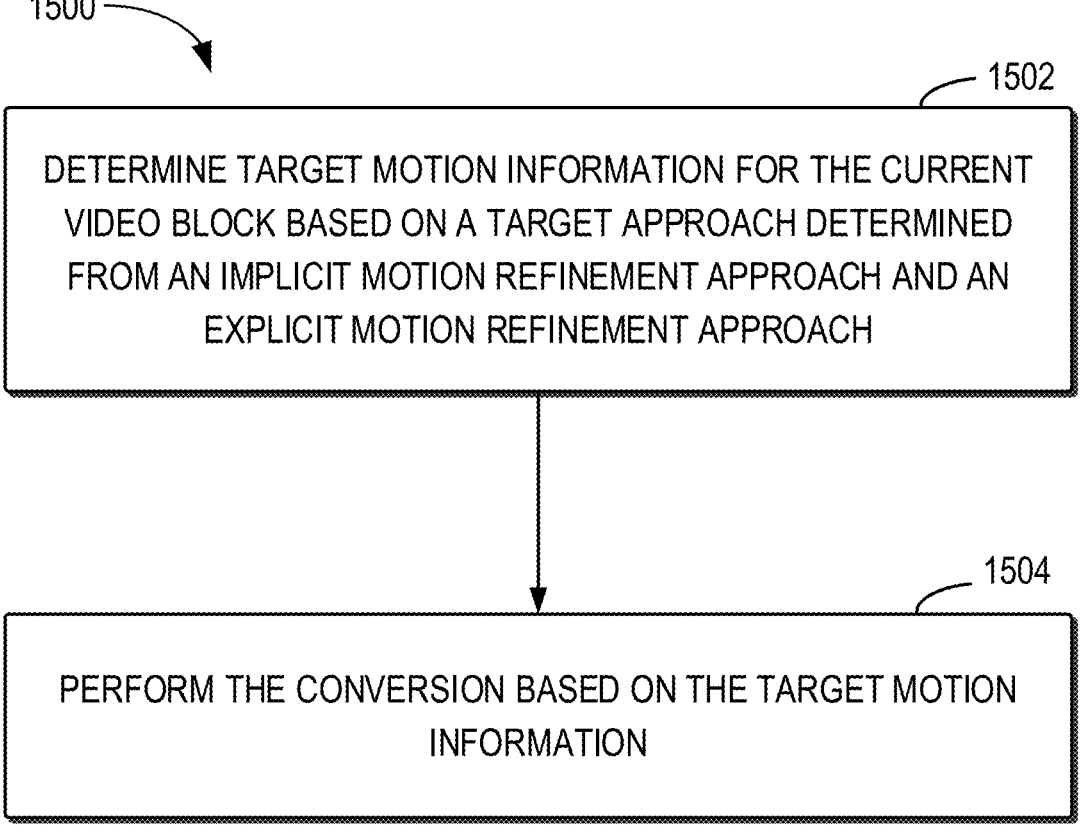
FIG. 15 illustrates a flowchart of another method for video processing in accordance with some embodiments of the present disclosure.

FIG. 15 illustrates another flowchart of a method 1500 for video processing in accordance with some embodiments of the present disclosure. The method 1500 may be implemented during a conversion between a current video block of a video and a bitstream of the video.

As shown in FIG. 15, the method 1500 starts at 1502 where target motion information for the current video block is determined based on a target approach. The target approach may be determined from an implicit motion refinement approach and an explicit motion refinement approach. In one example, the target approach may comprise the implicit motion refinement approach and the explicit motion refinement approach. The implicit motion refinement approach may be a decoder-side motion refinement approach, and the explicit motion refinement approach may be used for determining a motion difference information indicated in the bitstream. By way of example, the implicit motion refinement approach may be a template-matching-based (TM-based) motion refinement for refining a motion predictor or a motion candidate for the current video block based on a TM-based method. The explicit motion refinement approach may be a motion-vector-difference-based (MMVD-based) method which indicates the motion difference information for the current video block in the bitstream and adds the motion difference information to a motion predictor or a motion candidate for the current video block. It should be understood that the above illustrations and/or examples are described merely for purpose of description. The scope of the present disclosure is not limited in this respect.

At 1504, the conversion is performed based on the target motion information. In some embodiments, the conversion may include encoding the current video block into the bitstream. Alternatively or additionally, the conversion may include decoding the current video block from the bitstream.

The method 1500 concatenates MMVD and template matching, which can advantageously improve the coding efficiency and provide higher coding gain.

In some embodiments, both the implicit motion refinement approach and the explicit motion refinement approach may be allowed for at least one of: a GPM coded video unit, a CIIP coded video unit, a MHP coded video unit, or a regular merge coded video unit.

In some embodiments, a first set of syntax elements related to the implicit motion refinement approach may follow a second set of syntax elements related to the explicit motion refinement approach in the bitstream. By way of example, TM-based method related syntax elements may be signaled after the MMVD-based method related syntax elements in the bitstream. It should be understood that the above illustrations and/or examples are described merely for purpose of description. The scope of the present disclosure is not limited in this respect.

In some embodiments, the explicit motion refinement approach may be a motion-vector-difference-based (MMVD-based) method, whether to indicate the first set of syntax elements in the bitstream may be dependent on MMVD information for the current video block. Additionally or alternatively, how to indicate the first set of syntax elements in the bitstream may be dependent on MMVD information for the current video block. In one example, the MMVD information may comprise a MMVD offset value. It should be understood that the MMVD information may comprise any other suitable information. The scope of the present disclosure is not limited in this respect.

In some embodiments, if a zero MMVD offset is applied to the current video block, the first set of syntax elements may be associated with the current video block and indicated in the bitstream. By way of example, TM-based method related syntax elements may be signaled for the current video block, if a zero MMVD offset is applied to the current video block.

In some embodiments, if a zero MMVD offset is applied to a partition of the current video block, the first set of syntax elements may be associated with the partition and indicated in the bitstream. Alternatively, if a zero MMVD offset is applied to a subpartition of the current video block, the first set of syntax elements may be associated with the subpartition and indicated in the bitstream. In a further embodiment, if a zero MMVD offset is applied to a subblock of the current video block, the first set of syntax elements may be associated with the subblock and indicated in the bitstream. By way of example, TM-based method related syntax elements may be signaled for a specific subblock of the current video block, if a zero MMVD offset is applied to the subblock.

In some embodiments, if all of partitions of the current video block is coded with zero MMVD offset, the first set of syntax elements may be associated with the current video block and indicated in the bitstream. Alternatively, if all of subpartitions of the current video block is coded with zero MMVD offset, the first set of syntax elements may be associated with the current video block and indicated in the bitstream. In a further embodiment, if all of subblocks of the current video block is coded with zero MMVD offset, the first set of syntax elements may be associated with the current video block and indicated in the bitstream.

In some embodiments, both the first set of syntax elements and the second set of syntax elements may be indicated in the bitstream.

In some embodiments, the explicit motion refinement approach may be a motion-vector-difference-based (MMVD-based) method. At 1502, a candidate MV for the current video block may be obtained by adding a MVD for the current video block to a MV for the current video block. The MVD may be indicated in the bitstream based on the MMVD-based method. The candidate MV may be refined based on the implicit motion refinement approach to obtain a target MV for the target motion information.

In some embodiments, if the first set of syntax elements is absent from the bitstream, values of the first set of syntax elements indicate that the current video block is coded without using the implicit motion refinement approach.

In some embodiments, a first set of syntax elements related to the implicit motion refinement approach may precede a second set of syntax elements related to the explicit motion refinement approach in the bitstream. By way of example, TM-based method related syntax elements may be signaled before the MMVD-based method related syntax elements in the bitstream.

In some embodiments, whether to indicate the second set of syntax elements in the bitstream may be dependent on whether the implicit motion refinement approach is applied to the current video block. Additionally or alternatively, how to indicate the second set of syntax elements in the bitstream may be dependent on whether the implicit motion refinement approach is applied to the current video block.

In some embodiments, if the implicit motion refinement approach is not applied to the current video block, the second set of syntax elements may be associated with the current video block and indicated in the bitstream. By way of example, MMVD related syntax elements may be signaled for the current video block, if the implicit motion refinement approach is not applied to the current video block.

In some embodiments, if the implicit motion refinement approach is not applied to a partition of the current video block, the second set of syntax elements may be associated with the partition and indicated in the bitstream. Alternatively, if the implicit motion refinement approach is not applied to a subpartition of the current video block, the second set of syntax elements may be associated with the subpartition and indicated in the bitstream. In a further embodiment, if the implicit motion refinement approach is not applied to a subblock of the current video block, the second set of syntax elements may be associated with the subblock and indicated in the bitstream.

In some embodiments, if the implicit motion refinement approach is not applied to all of partitions of the current video block, the second set of syntax elements may be associated with the current video block and indicated in the bitstream. Alternatively, if the implicit motion refinement approach is not applied to all of subpartitions of the current video block, the second set of syntax elements may be associated with the current video block and indicated in the bitstream. In a further embodiment, if the implicit motion refinement approach is not applied to all of subblocks of the current video block, the second set of syntax elements may be associated with the current video block and indicated in the bitstream.

In some embodiments, both the first set of syntax elements and the second set of syntax elements may be indicated in the bitstream.

In some embodiments, the explicit motion refinement approach may be a motion-vector-difference-based (MMVD-based) method. At 1502, a MV for a partition of the current video block may be refined based on the implicit motion refinement approach. A MVD for the current video block may be added to the refined MV to obtain a target MV for the target motion information. The MVD may be indicated in the bitstream based on the MMVD-based method.

In some embodiments, if the second set of syntax elements are absent from the bitstream, values of the second set of syntax elements indicate that the current video block may be coded without using the explicit motion refinement approach.

In some embodiments, the first set of syntax elements may comprise at least one of: a TM flag for the current video block, separate TM flags for separate partitions of the current video block, separate TM flags for separate subpartitions of the current video block, separate TM flags for separate subblocks of the current video block, a TM based merge candidate index, or a TM based AMVP candidate index.

In some embodiments, the second set of syntax elements may comprise at least one of: a MMVD flag for the current video block, separate MMVD flags for separate partitions of the current video block, separate MMVD flags for separate subpartitions of the current video block, separate MMVD flags for separate subblocks of the current video block, a MMVD based merge candidate index, a MMVD offset direction, a MMVD offset distance, or a MMVD offset step.

In some embodiments, the explicit motion refinement approach may be a motion-vector-difference-based (MMVD-based) method. At 1502, a MV for a partition of the current video block may be refined based on the implicit motion refinement approach. A MVD for the current video block may be added to the refined MV to obtain a target MV for the target motion information. The MVD may be indicated in the bitstream based on the MMVD-based method.

In some embodiments, the explicit motion refinement approach may be a motion-vector-difference-based (MMVD-based) method. At 1502, a candidate MV for the current video block is obtained by adding a MVD for the current video block to a MV for the current video block. The MVD may be indicated in the bitstream based on the MMVD-based method. The candidate MV may be refined based on the implicit motion refinement approach to obtain a target MV for the target motion information.

In some embodiments, the implicit motion refinement approach may be a template-matching-based (TM-based) motion refinement. In one example, the TM-based motion refinement may be used for refining a motion predictor or a motion candidate for the current video block based on a TM-based method. In some embodiments, the explicit motion refinement approach may be a motion-vector-difference-based (MMVD-based) method. In one example, the MMVD-based method may be used for indicating the motion difference information for the current video block in the bitstream and adding the motion difference information to a motion predictor or a motion candidate for the current video block. It should be understood that the above illustrations and/or examples are described merely for purpose of description. The scope of the present disclosure is not limited in this respect.

In some embodiments, the current video block may comprise a plurality of parts, a first motion candidate for a first part of the plurality of parts may be the same as a second motion candidate for a second part of the plurality of parts, the second part may be different from the first part; and performing the conversion based on the target motion information. By way of example, motion candidates from all of the plurality of parts may be the same. Alternatively, motion candidates for at least two of the plurality of parts may be the same. In one example, the plurality of parts may be a plurality of subblocks. Alternatively, the plurality of parts may be a plurality of subpartitions. In another example, the plurality of parts may be a plurality of partition. Thereby, the method in accordance with some embodiments of the present disclosure allows two different parts of a block to have the same motion candidate, which can advantageously improve the coding efficiency and coding quality. It should be understood that the above illustrations and/or examples are described merely for purpose of description. The scope of the present disclosure is not limited in this respect.

In some embodiments, the first motion candidate and the second motion candidate may be motion candidates for the implicit motion refinement approach. Alternatively, the first motion candidate and the second motion candidate may be motion candidates for the explicit motion refinement approach.

In some embodiments, a motion candidate index for at least one of the plurality of parts may be absent from the bitstream. Alternatively, the number of motion candidate indexes indicated in the bitstream may be less than the number of parts contained in the plurality of parts. In some further embodiments, for the current video block, only one motion candidate index for a prediction method may be indicted in the bitstream.

In some embodiments, whether to indicate a motion candidate index in the bitstream or determine the motion candidate index may be dependent on a syntax element. By way of example, the syntax element may comprise one of: a syntax flag indicating whether a same candidate is used for all of the plurality of parts, or a syntax parameter indicating whether a same candidate is used for a specified part of the plurality of parts.

In some embodiments, a motion candidate index for each of the plurality of parts may be indicted in the bitstream independently. That is, indications of motion candidate indexed for the plurality of parts are independent from each other.

In some embodiments, the implicit motion refinement approach may be a template-matching-based (TM-based) method. By way of example, the explicit motion refinement approach may be a motion-vector-difference-based (MMVD-based) method. It should be understood that the above illustrations and/or examples are described merely for purpose of description. The scope of the present disclosure is not limited in this respect.

In some embodiments, whether to apply the method according to some embodiments of the present disclosure may be indicated at one of: sequence level, group of pictures level, picture level, slice level, or tile group level. Additionally or alternatively, how to apply the method according to some embodiments of the present disclosure may be indicated at one of: sequence level, group of pictures level, picture level, slice level, or tile group level.

In some embodiments, whether to apply the method according to some embodiments of the present disclosure may be indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header. Additionally or alternatively, how to apply the method according to some embodiments of the present disclosure may be indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, whether to apply a TM-based motion refinement for GPM, CIIP or MHP may be indicated at one of: sequence level, group of pictures level, picture level, slice level, or tile group level. Additionally or alternatively, how to apply a TM-based motion refinement for GPM, CIIP or MHP may be indicated at one of: sequence level, group of pictures level, picture level, slice level, or tile group level.

In some embodiments, whether to apply a TM-based motion refinement for GPM, CIIP or MHP may be indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header. Additionally or alternatively, how to apply a TM-based motion refinement for GPM, CIIP or MHP may be indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, whether to apply a MMVD-based method for GPM, CIIP or MHP may be indicated at one of: sequence level, group of pictures level, picture level, slice level, or tile group level. Additionally or alternatively, how to apply a MMVD-based method for GPM, CIIP or MHP may be indicated at one of: sequence level, group of pictures level, picture level, slice level, or tile group level.

In some embodiments, whether to apply a MMVD-based method for GPM, CIIP or MHP may be indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header. Additionally or alternatively, how to apply a MMVD-based method for GPM, CIIP or MHP may be indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, whether a syntax element is present may be dependent on a width of a picture associated with the current video block or a height of the picture. Additionally or alternatively, whether a syntax element is present may be dependent on a width of a slice associated with the current video block or a height of the slice.

In some embodiments, whether to apply the method according to some embodiments of the present disclosure may be indicated at one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel. Additionally or alternatively, how to apply the method according to some embodiments of the present disclosure may be indicated at one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel In some embodiments, the method according to some embodiments of the present disclosure may further comprise: determining, based on coded information of the cur-rent video unit, whether to and/or how to apply the method according to some embodiments of the present disclosure. The coded information may comprise at least one of: a block size, a color format, a single dual tree partitioning, a dual tree partitioning, a color component, a slice type, a picture type, or the like. It should be understood that the above illustrations and/or examples are described merely for pur-pose of description. The scope of the present disclosure is not limited in this respect.

In some embodiments, a bitstream of a video may be stored in a non-transitory computer-readable recording medium. The bitstream of the video can be generated by a method performed by a video processing apparatus. According to the method, target motion information for the current video block may be determined based on a target approach determined from an implicit motion refinement approach and an explicit motion refinement approach. The implicit motion refinement approach may be a decoder-side motion refinement approach, The explicit motion refinement approach may be used for determining a motion difference information indicated in the bitstream. A bitstream of the current video block may be generated based on the target motion information.

In some embodiments, target motion information for the current video block may be determined based on a target approach determined from an implicit motion refinement approach and an explicit motion refinement approach. The implicit motion refinement approach may be a decoder-side motion refinement approach, The explicit motion refinement approach may be used for determining a motion difference information indicated in the bitstream. A bitstream of the current video block may be generated based on the target motion information. The bitstream may be stored in a non-transitory computer-readable recording medium.

Implementations of the present disclosure can be described in view of the following clauses, the features of which can be combined in any reasonable manner.

Clause 1. A method for video processing, comprising: determining, during a conversion between a current video block of a video and a bitstream of the video, whether to insert a target motion candidate for the current video block into a prediction list for the current video block based on a comparison between the target motion candidate and at least one existing motion candidate in the prediction list; and performing the conversion based on the determination.

Clause 2. The method of clause 1, wherein the prediction list comprises one of: a geometric partition mode (GPM) candidate list, a multi-hypothesis prediction (MHP) base hypothesis candidate list, a template matching (TM) candidate list, a decoder-side motion vector refinement (DMVR) candidate list, a block-based decoder-side motion vector refinement (BDMVR) candidate list, a multi-pass decoder-side motion vector refinement (MPDMVR) candidate list, or a regular advanced motion vector prediction (AMVP) candidate list.

Clause 3. The method of any of clauses 1-2, wherein the at least one existing motion candidate comprises all of existing motion candidates in the prediction list.

Clause 4. The method of any of clauses 1-3, wherein the target motion candidate is compared with a set of existing motion candidates at pre-defined positions in the prediction list, and the number of existing motion candidates contained in the set of existing motion candidates is less than or equal to a pre-defined value.

Clause 5. The method of clause 4, wherein the set of existing motion candidates are located at the end of the prediction list.

Clause 6. The method of clause 4, wherein the set of existing motion candidates comprise existing motion candidates at the first and third positions from the end of the prediction list.

Clause 7. The method of clause 4, wherein the set of existing motion candidates comprise an existing motion candidate at the second position from the end of the prediction list.

Clause 8. The method of clause 4, wherein the set of existing motion candidates comprise an existing motion candidate at the end of the prediction list.

Clause 9. The method of any of clauses 1-8, wherein determining whether to insert the target motion candidate into the prediction list comprises: determining whether the target motion candidate and a first existing motion candidate of the at least one existing motion candidate are identical; and if the target motion candidate and the first existing motion candidate are identical, determining that the target motion candidate is not inserted into the prediction list.

Clause 10. The method of clause 9, wherein determining whether the target motion candidate and the first existing motion candidate are identical comprises: determining whether a motion vector (MV) for the target motion candidate and a MV for the first existing motion candidate are identical; and if the MV for the target motion candidate and the MV for the first existing motion candidate are identical, determining that the target motion candidate and the first existing motion candidate are identical.

Clause 11. The method of clause 10, wherein determining whether a motion vector (MV) for the target motion candidate and a MV for the first existing motion candidate are identical comprises: if a horizontal component of the MV for the target motion candidate and a horizontal component of the MV for the first existing motion candidate are identical and a vertical component of the MV for the target motion candidate and a vertical component of the MV for the first existing motion candidate are identical, determining that the MV for the target motion candidate and the MV for the first existing motion candidate are identical.

Clause 12. The method of clause 9, wherein determining whether the target motion candidate and the first existing motion candidate are identical comprises: determining whether a reference index for the target motion candidate and a reference index for the first existing motion candidate are identical; and if the reference index for the target motion candidate and the reference index for the first existing motion candidate are identical, determining that the target motion candidate and the first existing motion candidate are identical.

Clause 13. The method of clause 9, wherein determining whether the target motion candidate and the first existing motion candidate are identical comprises: determining whether a bi-prediction with CU-level weight (BCW) index for the target motion candidate and a BCW index for the first existing motion candidate are identical; and if the BCW index for the target motion candidate and the BCW index for the first existing motion candidate are identical, determining that the target motion candidate and the first existing motion candidate are identical.

Clause 14. The method of clause 9, wherein determining whether the target motion candidate and the first existing motion candidate are identical comprises: determining whether a local illumination compensation (LIC) flag for the target motion candidate and a LIC flag for the first existing motion candidate are identical; and if the LIC flag for the target motion candidate and the LIC flag for the first existing motion candidate are identical, determining that the target motion candidate and the first existing motion candidate are identical.

Clause 15. The method of clause 9, wherein determining whether the target motion candidate and the first existing motion candidate are identical comprises: determining whether an overlapped block motion compensation (OBMC) flag for the target motion candidate and an OBMC flag for the first existing motion candidate are identical; and if the OBMC flag for the target motion candidate and the OBMC flag for the first existing motion candidate are identical, determining that the target motion candidate and the first existing motion candidate are identical.

Clause 16. The method of clause 9, wherein determining whether the target motion candidate and the first existing motion candidate are identical comprises: determining whether a motion vector precision for the target motion candidate and a motion vector precision for the first existing motion candidate are identical; and if the motion vector precision for the target motion candidate and the motion vector precision for the first existing motion candidate are identical, determining that the target motion candidate and the first existing motion candidate are identical.

Clause 17. The method of clause 9, wherein determining whether the target motion candidate and the first existing motion candidate are identical comprises: determining whether an interpolation filter for the target motion candidate and an interpolation filter for the first existing motion candidate are identical; and if the interpolation filter for the target motion candidate and the interpolation filter for the first existing motion candidate are identical, determining that the target motion candidate and the first existing motion candidate are identical.

Clause 18. The method of clause 9, wherein determining whether the target motion candidate and a first existing motion candidate of the at least one existing motion candidate are identical comprises: if at least two of the following are satisfied, determining that the target motion candidate and the first existing motion candidate are identical: a MV for the target motion candidate and a MV for the first existing motion candidate are identical, a reference index for the target motion candidate and a reference index for the first existing motion candidate are identical, a BCW index for the target motion candidate and a BCW index for the first existing motion candidate are identical, a LIC flag for the target motion candidate and a LIC flag for the first existing motion candidate are identical, an OBMC flag for the target motion candidate and an OBMC flag for the first existing motion candidate are identical, a motion vector precision for the target motion candidate and a motion vector precision for the first existing motion candidate are identical, or an interpolation filter for the target motion candidate and an interpolation filter for the first existing motion candidate are identical.

Clause 19. The method of any of clauses 9-18, wherein whether the target motion candidate and the first existing motion candidate are identical is determined with or without determining whether a first piece of side information of the target motion candidate and a first piece of side information of the first existing motion candidate are identical.

Clause 20. The method of clause 19, wherein the first piece of side information is a BCW index or a LIC flag.

Clause 21. The method of any of clauses 1-8, wherein determining whether to insert the target motion candidate into the prediction list comprises: determining a difference between the target motion candidate and a first existing motion candidate of the at least one existing motion candidate by using at least one threshold; and determining whether to insert the target motion candidate into the prediction list based on the difference.

Clause 22. The method of clause 21, wherein determining the difference between the target motion candidate and the first existing motion candidate comprises: determining a motion vector difference between a MV for the target motion candidate and a MV for the first existing motion candidate by using a first threshold of the at least one threshold.

Clause 23. The method of clause 22, wherein if an absolute of the motion vector difference is smaller than or equal to the first threshold, determining that the target motion candidate is not inserted into the prediction list.

Clause 24. The method of any of clauses 21-23, wherein determining the difference between the target motion candidate and the first existing motion candidate comprises: determining a reference index difference between a reference index for the target motion candidate and a reference index for the first existing motion candidate by using a second threshold of the at least one threshold.

Clause 25. The method of any of clauses 21-24, wherein one of the at least one threshold is indicate in the bitstream.

Clause 26. The method of any of clauses 21-25, wherein one of the at least one threshold is dependent on coded information of the video.

Clause 27. The method of clause 26, wherein the coded information comprises at least one of: a motion vector precision of a motion candidate, BCW information, LIC information, motion compensation interpolation filter information, OBMC information, a width of a coding unit, or a height of the coding unit.

Clause 28. The method of any of clauses 26-27, wherein the coded information comprises types of prediction lists.

Clause 29. The method of clause 28, wherein the at least one threshold comprises a third threshold for generating a first type of prediction list and a fourth threshold for generating a second type of prediction list, the first type of prediction list is different from the second type of prediction list, and the third threshold is different from the fourth threshold.

Clause 30. The method of clause 28, wherein the at least one threshold comprises a third threshold for generating a first type of prediction list and a fourth threshold for generating a second type of prediction list, the first type of prediction list is different from the second type of prediction list, and the third threshold is the same as the fourth threshold.

Clause 31. The method of clause 30, wherein a difference check procedure for generating the first type of prediction list is the same as a difference check procedure for generating the second type of prediction list.

Clause 32. The method of any of clauses 30-31, wherein the first type of prediction list or the second type of prediction list is one of: a geometric partition mode (GPM) candidate list, a multi-hypothesis prediction (MHP) prediction list for additional hypothesis, a MHP base hypothesis candidate list, a template matching (TM) candidate list, a decoder-side motion vector refinement (DMVR) candidate list, a block-based decoder-side motion vector refinement (BDMVR) candidate list, a multi-pass decoder-side motion vector refinement (MPDMVR) candidate list, an affine advanced motion vector prediction (AMVP) candidate list, an affine merge candidate list, a regular merge candidate list, a regular AMVP candidate list, or a subblock-based temporal motion vector prediction (SbTMVP) candidate list.

Clause 33. The method of any of clauses 1-32, wherein how to perform the comparison during the determination of whether to insert the target motion candidate into the prediction list is dependent on coded information of the video.

Clause 34. The method of any of clauses 1-32, wherein the comparison is dependent on reference picture list information of the target motion candidate.

Clause 35. The method of clause 34, wherein the comparison is performed if reference picture information in a first reference picture list for the target motion candidate and reference picture information in a second reference picture list for the target motion candidate indicate different reference pictures.

Clause 36. The method of clause 35, wherein the target motion candidate is not inserted into the prediction list.

Clause 37. The method of any of clauses 1-36, wherein the prediction list comprises at least one of: a uni-directional prediction list, or a bi-directional prediction list.

Clause 38. The method of clause 33, wherein whether to use identical motion vector check or threshold-based motion vector check is dependent on reference picture list information of the target motion candidate.

Clause 39. The method of clause 38, wherein if all of reference pictures in a first reference picture list and a second reference picture list for the target motion candidate are the same, the identical motion vector check is applied to the target motion candidate.

Clause 40. The method of clause 38, wherein if all of reference pictures in a first reference picture list and a second reference picture list for the target motion candidate are the same, the threshold-based motion vector check is applied to the target motion candidate.

Clause 41. The method of clause 38, wherein if at least one of reference pictures in a first reference picture list and a second reference picture list for the target motion candidate are different, the identical motion vector check is applied to the target motion candidate.

Clause 42. The method of clause 38, wherein if at least one of reference pictures in a first reference picture list and a second reference picture list for the target motion candidate are different, the threshold-based motion vector check is applied to the target motion candidate.

Clause 43. The method of any of clauses 1-42, wherein performing the conversion comprises: updating the prediction list by appending at least one additional candidate for the current video block at the end of the prediction list; and performing the conversion based on the updated prediction list.

Clause 44. The method of clause 43, wherein the prediction list is a GPM prediction list or a MHP prediction list for additional hypothesis generation.

Clause 45. The method of any of clauses 43-44, wherein the number of at least one additional candidate is dependent on the maximum allowed length of the prediction list.

Clause 46. The method of clause 45, wherein the maximum allowed length of the prediction list is predefined, or the maximum allowed length of the prediction list is indicated in the bitstream.

Clause 47. The method of any of clauses 45-46, wherein if the number of existing motion candidate in the prediction list is less than the maximum allowed length of the prediction list, the at least one additional candidate is inserted into the prediction list until the number of existing motion candidate in the prediction list reach the maximum allowed length of the prediction list.

Clause 48. The method of clause 47, wherein the at least one additional candidate is generated by averaging motion candidates in the prediction list.

Clause 49. The method of clause 48, wherein the target motion candidate is inserted into the prediction list with or without a further comparison with one of the at least one additional candidate.

Clause 50. The method of any of clauses 48-49, wherein averaging the motion candidates in the prediction list comprises an averaging process on MVs of the motion candidates.

Clause 51. The method of clause 47, wherein the at least one additional candidate is zero motion candidate.

Clause 52. The method of clause 51, wherein the at least one additional candidate is appended at the end of the prediction list.

Clause 53. The method of any of clauses 51-52, wherein the target motion candidate is inserted into the prediction list without a further comparison with a zero motion candidate at the end of the prediction list.

Clause 54. The method of any of clauses 1-42, wherein performing the conversion comprises: updating the prediction list by appending at least one additional candidate for the current video block at the end of the prediction list; and performing the conversion based on the updated prediction list.

Clause 55. The method of clause 54, wherein updating the prediction list further comprises: inserting a fixed number of averaged candidates or a fixed number of zero motion candidates into the prediction list.

Clause 56. The method of any of clauses 1-55, wherein if template matching based motion refinement is applied to one of the following, the prediction list comprises template matching based prediction list: GPM motion candidates, combined intra and inter prediction (CIIP) motion candidates, or MHP additional hypothetic motion candidates.

Clause 57. A method for video processing, comprising: reordering, during a conversion between a current video block of a video and a bitstream of the video, a prediction list for the current video block if a template matching based motion refinement is applied to motion candidates for the current video block; and performing the conversion based on the reordered prediction list.

Clause 58. The method of clause 57, wherein the motion candidates being one of: GPM motion candidates, CIIP motion candidates, or MHP additional hypothetic motion candidates.

Clause 59. The method of any of clauses 57-58, wherein reordering the prediction list is based on a criterion that a cost value of each candidate in the prediction list is evaluated from at least one of picture neighboring samples information or reference picture reference samples information of the current video block.

Clause 60. The method of any of clauses 57-59, further comprising: determining, before reordering the prediction list, whether to insert a target motion candidate for the current video block into the prediction list based on a comparison between the target motion candidate and at least one existing motion candidate in the prediction list, or determining whether to insert a target motion candidate for the current video block into the reordered prediction list based on a comparison between the target motion candidate and at least one existing motion candidate in the reordered prediction list.

Clause 61. A method for video processing, comprising: determining, during a conversion between a current video block of a video and a bitstream of the video, target motion information for the current video block based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; and performing the conversion based on the target motion information.

Clause 62. The method of clause 61, wherein both the implicit motion refinement approach and the explicit motion refinement approach are allowed for at least one of: a GPM coded video unit, a CIIP coded video unit, a MHP coded video unit, or a regular merge coded video unit.

Clause 63. The method of any of clauses 61-62, wherein a first set of syntax elements related to the implicit motion refinement approach follow a second set of syntax elements related to the explicit motion refinement approach in the bitstream.

Clause 64. The method of clause 63, wherein the explicit motion refinement approach is a motion-vector-difference-based (MMVD-based) method, at least one of the following is dependent on MMVD information for the current video block: whether to indicate the first set of syntax elements in the bitstream, or how to indicate the first set of syntax elements in the bitstream.

Clause 65. The method of clause 64, wherein the MMVD information comprises a MMVD offset value.

Clause 66. The method of clause 64, wherein if a zero MMVD offset is applied to the current video block, the first set of syntax elements are associated with the current video block and indicated in the bitstream.

Clause 67. The method of clause 64, wherein if a zero MMVD offset is applied to a partition of the current video block, the first set of syntax elements are associated with the partition and indicated in the bitstream, or if a zero MMVD offset is applied to a subpartition of the current video block, the first set of syntax elements are associated with the subpartition and indicated in the bitstream, or if a zero MMVD offset is applied to a subblock of the current video block, the first set of syntax elements are associated with the subblock and indicated in the bitstream.

Clause 68. The method of clause 64, wherein if all of partitions of the current video block are coded with zero MMVD offset, the first set of syntax elements are associated with the current video block and indicated in the bitstream, or if all of subpartitions of the current video block are coded with zero MMVD offset, the first set of syntax elements are associated with the current video block and indicated in the bitstream, or if all of subblocks of the current video block are coded with zero MMVD offset, the first set of syntax elements are associated with the current video block and indicated in the bitstream.

Clause 69. The method of clause 63, wherein both the first set of syntax elements and the second set of syntax elements are indicated in the bitstream.

Clause 70. The method of clause 69, wherein the explicit motion refinement approach is a motion-vector-difference-based (MMVD-based) method, and determining the target motion information comprises: obtaining a candidate MV for the current video block by adding a MVD for the current video block to a MV for the current video block, the MVD being indicated in the bitstream based on the MMVD-based method; and refining the candidate MV based on the implicit motion refinement approach to obtain a target MV for the target motion information.

Clause 71. The method of clause 63, wherein if the first set of syntax elements are absent from the bitstream, values of the first set of syntax elements indicate that the current video block are coded without using the implicit motion refinement approach.

Clause 72. The method of any of clauses 61-62, wherein a first set of syntax elements related to the implicit motion refinement approach precede a second set of syntax elements related to the explicit motion refinement approach in the bitstream.

Clause 73. The method of clause 72, wherein at least one of the following is dependent on whether the implicit motion refinement approach is applied to the current video block: whether to indicate the second set of syntax elements in the bitstream, or how to indicate the second set of syntax elements in the bitstream.

Clause 74. The method of clause 73, wherein if the implicit motion refinement approach is not applied to the current video block, the second set of syntax elements are associated with the current video block and indicated in the bitstream.

Clause 75. The method of clause 73, wherein if the implicit motion refinement approach is not applied to a partition of the current video block, the second set of syntax elements are associated with the partition and indicated in the bitstream, or if the implicit motion refinement approach is not applied to a subpartition of the current video block, the second set of syntax elements are associated with the subpartition and indicated in the bitstream, or if the implicit motion refinement approach is not applied to a subblock of the current video block, the second set of syntax elements are associated with the subblock and indicated in the bitstream.

Clause 76. The method of clause 73, wherein if the implicit motion refinement approach is not applied to all of partitions of the current video block, the second set of syntax elements are associated with the current video block and indicated in the bitstream, or if the implicit motion refinement approach is not applied to all of subpartitions of the current video block, the second set of syntax elements are associated with the current video block and indicated in the bitstream, or if the implicit motion refinement approach is not applied to all of subblocks of the current video block, the second set of syntax elements are associated with the current video block and indicated in the bitstream.

Clause 77. The method of clause 72, wherein both the first set of syntax elements and the second set of syntax elements are indicated in the bitstream.

Clause 78. The method of clause 77, wherein the explicit motion refinement approach is a motion-vector-difference-based (MMVD-based) method, and determining the target motion information comprises: refining a MV for a partition of the current video block based on the implicit motion refinement approach; and adding a MVD for the current video block to the refined MV to obtain a target MV for the target motion information, the MVD being indicated in the bitstream based on the MMVD-based method.

Clause 79. The method of clause 72, wherein if the second set of syntax elements are absent from the bitstream, values of the second set of syntax elements indicate that the current video block are coded without using the explicit motion refinement approach.

Clause 80. The method of any of clauses 63-79, wherein the first set of syntax elements comprise at least one of: a TM flag for the current video block, separate TM flags for separate partitions of the current video block, separate TM flags for separate subpartitions of the current video block, separate TM flags for separate subblocks of the current video block, a TM based merge candidate index, or a TM based AMVP candidate index.

Clause 81. The method of any of clauses 63-80, wherein the second set of syntax elements comprise at least one of:

a MMVD flag for the current video block, separate MMVD flags for separate partitions of the current video block, separate MMVD flags for separate subpartitions of the current video block, separate MMVD flags for separate subblocks of the current video block, a MMVD based merge candidate index, a MMVD offset direction, a MMVD offset distance, or a MMVD offset step.

Clause 82. The method of any of clauses 61-69, wherein the explicit motion refinement approach is a motion-vector-difference-based (MMVD-based) method, and determining the target motion information comprises: refining a MV for a partition of the current video block based on the implicit motion refinement approach; and adding a MVD for the current video block to the refined MV to obtain a target MV for the target motion information, the MVD being indicated in the bitstream based on the MMVD-based method.

Clause 83. The method of any of clauses 61-69, wherein the explicit motion refinement approach is a motion-vector-difference-based (MMVD-based) method, and determining the target motion information comprises: obtaining a candidate MV for the current video block by adding a MVD for the current video block to a MV for the current video block, the MVD being indicated in the bitstream based on the MMVD-based method; and refining the candidate MV based on the implicit motion refinement approach to obtain a target MV for the target motion information.

Clause 84. The method of any of clauses 61-83, wherein the implicit motion refinement approach is a template-matching-based (TM-based) motion refinement.

Clause 85. The method of clause 84, wherein the TM-based motion refinement is used for refining a motion predictor or a motion candidate for the current video block based on a TM-based method.

Clause 86. The method of any of clauses 61-85, wherein the explicit motion refinement approach is a motion-vector-difference-based (MMVD-based) method.

Clause 87. The method of clause 86, wherein the MMVD-based method is used for indicating the motion difference information for the current video block in the bitstream and adding the motion difference information to a motion predictor or a motion candidate for the current video block.

Clause 88. The method of clause 61, wherein the current video block comprises a plurality of parts, a first motion candidate for a first part of the plurality of parts being the same as a second motion candidate for a second part of the plurality of parts, the second part being different from the first part.

Clause 89. The method of clause 88, wherein the plurality of parts being one of: a plurality of subblocks, a plurality of subpartitions, or a plurality of partition.

Clause 90. The method of any of clauses 88-89, wherein the first motion candidate and the second motion candidate are motion candidates for the implicit motion refinement approach, or the first motion candidate and the second motion candidate are motion candidates for the explicit motion refinement approach.

Clause 91. The method of any of clauses 88-90, wherein motion candidates from all of the plurality of parts are the same.

Clause 92. The method of any of clauses 88-90, wherein motion candidates for at least two of the plurality of parts are the same.

Clause 93. The method of any of clauses 88-90, wherein a motion candidate index for at least one of the plurality of parts is absent from the bitstream.

Clause 94. The method of any of clauses 88-90, wherein the number of motion candidate indexes indicated in the bitstream is less than the number of parts contained in the plurality of parts.

Clause 95. The method of clause 94, wherein, for the current video block, only one motion candidate index for a prediction method is indicted in the bitstream.

Clause 96. The method of any of clauses 88-90, wherein whether to indicate a motion candidate index in the bitstream or determine the motion candidate index is dependent on a syntax element.

Clause 97. The method of clause 96, wherein the syntax element comprises one of: a syntax flag indicating whether a same candidate is used for all of the plurality of parts, or a syntax parameter indicating whether a same candidate is used for a specified part of the plurality of parts.

Clause 98. The method of any of clauses 88-90, wherein a motion candidate index for each of the plurality of parts is indicted in the bitstream independently.

Clause 99. The method of any of clauses 88-98, wherein the implicit motion refinement approach is a template-matching-based (TM-based) method.

Clause 100. The method of any of clauses 88-99, wherein the explicit motion refinement approach is a motion-vector-difference-based (MMVD-based) method.

Clause 101. The method of any of clauses 1-100, wherein whether to and/or how to apply the method is indicated at one of: sequence level, group of pictures level, picture level, slice level, or tile group level.

Clause 102. The method of any of clauses 1-100, wherein whether to and/or how to apply the method is indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 103. The method of any of clauses 1-100, wherein whether to and/or how to apply a TM-based motion refinement for one of GPM, CIIP or MHP is indicated at one of: sequence level, group of pictures level, picture level, slice level, or tile group level.

Clause 104. The method of any of clauses 1-100, wherein whether to and/or how to apply a TM-based motion refinement for one of GPM, CIIP or MHP is indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 105. The method of any of clauses 1-100, wherein whether to and/or how to apply a MMVD-based method for one of GPM, CIIP or MHP is indicated at one of: sequence level, group of pictures level, picture level, slice level, or tile group level.

Clause 106. The method of any of clauses 1-100, wherein whether to and/or how to apply a MMVD-based method for one of GPM, CIIP or MHP is indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 107. The method of any of clauses 101-102, wherein whether a syntax element is present is dependent on at least one of: a width of a picture associated with the current video block, a height of the picture, a width of a slice associated with the current video block, or a height of the slice.

Clause 108. The method of any of clauses 1-100, wherein whether to and/or how to apply the method is indicated at one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 109. The method of any of clauses 1-100, further comprising: determining, based on coded information of the current video unit, whether to and/or how to apply the method, the coded information comprising at least one of: a block size, a colour format, a single dual tree partitioning, a dual tree partitioning, a colour component, a slice type, or a picture type.

Clause 110. The method of any of clauses 1-109, wherein the conversion includes encoding the current video block into the bitstream.

Clause 111. The method of any of clauses 1-109, wherein the conversion includes decoding the current video block from the bitstream.

Clause 112. An apparatus for processing video data comprising a processor and a non-transitory memory with instructions thereon, wherein the instructions upon execution by the processor, cause the processor to perform a method in accordance with any of Clauses 1-111.

Clause 113. A non-transitory computer-readable storage medium storing instructions that cause a processor to perform a method in accordance with any of Clauses 1-111.

Clause 114. A non-transitory computer-readable recording medium storing a bitstream of a video which is generated by a method performed by a video processing apparatus, wherein the method comprises: determining whether to insert a target motion candidate for a current video block of the video into a prediction list for the current video block based on a comparison between the target motion candidate and at least one existing motion candidate in the prediction list; and generating the bitstream based on the determination.

Clause 115. A method for storing a bitstream of a video, comprising: determining whether to insert a target motion candidate for a current video block of the video into a prediction list for the current video block based on a comparison between the target motion candidate and at least one existing motion candidate in the prediction list; generating the bitstream based on the determination; and storing the bitstream in a non-transitory computer-readable recording medium.

Clause 116. A non-transitory computer-readable recording medium storing a bitstream of a video which is generated by a method performed by a video processing apparatus, wherein the method comprises: reordering a prediction list for a current video block of the video, if a template matching based motion refinement is applied to motion candidates for the current video block; and generating the bitstream based on the reordered prediction list.

Clause 117. A method for storing a bitstream of a video, comprising: reordering a prediction list for a current video block of the video, if a template matching based motion refinement is applied to motion candidates for the current video block; generating the bitstream based on the reordered prediction list; and storing the bitstream in a non-transitory computer-readable recording medium.

Clause 118. A non-transitory computer-readable recording medium storing a bitstream of a video which is generated by a method performed by a video processing apparatus, wherein the method comprises: determining target motion information for a current video block of the video based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; and generating the bitstream based on the target motion information.

Clause 119. A method for storing a bitstream of a video, comprising: determining target motion information for a current video block of the video based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; generating the bitstream based on the target motion information; and storing the bitstream in a non-transitory computer-readable recording medium.

Example Device

Figure 16:
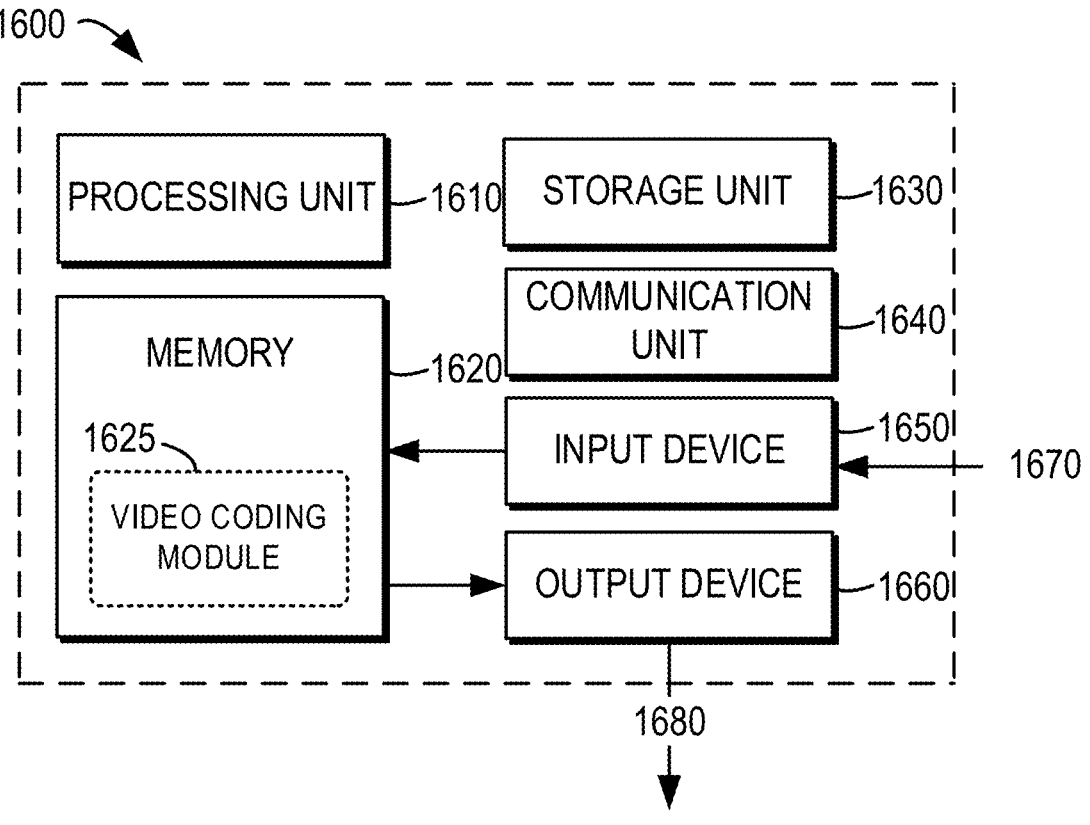
FIG. 16 illustrates a block diagram of a computing device in which various embodiments of the present disclosure can be implemented.

FIG. 16 illustrates a block diagram of a computing device 1600 in which various embodiments of the present disclosure can be implemented. The computing device 1600 may be implemented as or included in the source device 110 (or the video encoder 114 or 200) or the destination device 120 (or the video decoder 124 or 300).

It would be appreciated that the computing device 1600 shown in FIG. 16 is merely for purpose of illustration, without suggesting any limitation to the functions and scopes of the embodiments of the present disclosure in any manner.

As shown in FIG. 16, the computing device 1600 includes a general-purpose computing device 1600. The computing device 1600 may at least comprise one or more processors or processing units 1610, a memory 1620, a storage unit 1630, one or more communication units 1640, one or more input devices 1650, and one or more output devices 1660.

In some embodiments, the computing device 1600 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1600 can support any type of interface to a user (such as "wearable" circuitry and the like).

The processing unit 1610 may be a physical or virtual processor and can implement various processes based on programs stored in the memory 1620. In a multi-processor system, multiple processing units execute computer executable instructions in parallel so as to improve the parallel processing capability of the computing device 1600. The processing unit 1610 may also be referred to as a central processing unit (CPU), a microprocessor, a controller or a microcontroller.

The computing device 1600 typically includes various computer storage medium. Such medium can be any medium accessible by the computing device 1600, including, but not limited to, volatile and non-volatile medium, or detachable and non-detachable medium. The memory 1620 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1630 may be any detachable or non-detachable medium and may include a machine-readable medium such as a memory, flash memory drive, magnetic disk or another other media, which can be used for storing information and/or data and can be accessed in the computing device 1600.

The computing device 1600 may further include additional detachable/non-detachable, volatile/non-volatile memory medium. Although not shown in FIG. 16, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1640 communicates with a further computing device via the communication medium. In addition, the functions of the components in the computing device 1600 can be implemented by a single computing cluster or multiple computing machines that can communicate via communication connections. Therefore, the computing device 1600 can operate in a networked environment using a logical connection with one or more other servers, networked personal computers (PCs) or further general network nodes.

The input device 1650 may be one or more of a variety of input devices, such as a mouse, keyboard, tracking ball, voice-input device, and the like. The output device 1660 may be one or more of a variety of output devices, such as a display, loudspeaker, printer, and the like. By means of the communication unit 1640, the computing device 1600 can further communicate with one or more external devices (not shown) such as the storage devices and display device, with one or more devices enabling the user to interact with the computing device 1600, or any devices (such as a network card, a modem and the like) enabling the computing device 1600 to communicate with one or more other computing devices, if required. Such communication can be performed via input/output (I/O) interfaces (not shown).

In some embodiments, instead of being integrated in a single device, some or all components of the computing device 1600 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1600 may be used to implement video encoding/decoding in embodiments of the present disclosure. The memory 1620 may include one or more video coding modules 1625 having one or more program instructions. These modules are accessible and executable by the processing unit 1610 to perform the functionalities of the various embodiments described herein.

In the example embodiments of performing video encoding, the input device 1650 may receive video data as an input 1670 to be encoded. The video data may be processed, for example, by the video coding module 1625, to generate an encoded bitstream. The encoded bitstream may be provided via the output device 1660 as an output 1680.

In the example embodiments of performing video decoding, the input device 1650 may receive an encoded bitstream as the input 1670. The encoded bitstream may be processed, for example, by the video coding module 1625, to generate decoded video data. The decoded video data may be provided via the output device 1660 as the output 1680.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:
determining, during a conversion between a current video block of a video and a bitstream of the video, target motion information for the current video block based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; and
performing the conversion based on the target motion information,
wherein a first set of syntax elements related to the implicit motion refinement approach follow a second set of syntax elements related to the explicit motion refinement approach in the bitstream.

2. The method of claim 1, wherein both the implicit motion refinement approach and the explicit motion refinement approach are allowed for at least one of:
a geometric partition mode (GPM) coded video unit,
a combined intra and inter prediction (CIIP) coded video unit,
a multi-hypothesis prediction (MHP) coded video unit, or
a regular merge coded video unit.

3. The method of claim 2, wherein the explicit motion refinement approach is a motion-vector-difference-based (MMVD-based) method, at least one of the following is dependent on MMVD information for the current video block:
whether to indicate the first set of syntax elements in the bitstream, or
how to indicate the first set of syntax elements in the bitstream.

4. The method of claim 3, wherein the MMVD information comprises a MMVD offset value, or
wherein when a zero MMVD offset is applied to the current video block, the first set of syntax elements are associated with the current video block and indicated in the bitstream, or
wherein when all of partitions of the current video block are coded with zero MMVD offset, the first set of syntax elements are associated with the current video block and indicated in the bitstream, or
when all of subpartitions of the current video block are coded with zero MMVD offset, the first set of syntax elements are associated with the current video block and indicated in the bitstream, or
when all of subblocks of the current video block are coded with zero MMVD offset, the first set of syntax elements are associated with the current video block and indicated in the bitstream.

5. The method of claim 2, wherein if the first set of syntax elements are absent from the bitstream, values of the first set of syntax elements indicate that the current video block are coded without using the implicit motion refinement approach, or
wherein the first set of syntax elements comprise at least one of:
a TM flag for the current video block,
separate TM flags for separate partitions of the current video block,
separate TM flags for separate subpartitions of the current video block,
separate TM flags for separate subblocks of the current video block,
a TM based merge candidate index, or
a TM based advanced motion vector prediction (AMVP) candidate index, or
wherein the second set of syntax elements comprise at least one of:
a MMVD flag for the current video block,
separate MMVD flags for separate partitions of the current video block,
separate MMVD flags for separate subpartitions of the current video block,
separate MMVD flags for separate subblocks of the current video block,
a MMVD based merge candidate index,
a MMVD offset direction,
a MMVD offset distance, or
a MMVD offset step.

6. The method of claim 1, wherein the implicit motion refinement approach is a template-matching-based (TM-based) motion refinement, or
wherein the explicit motion refinement approach is a motion-vector-difference-based (MMVD-based) method.

7. The method of claim 6, wherein the TM-based motion refinement is used for refining a motion predictor or a motion candidate for the current video block based on a TM-based method, or wherein the MMVD-based method is used for indicating the motion difference information for the current video block in the bitstream and adding the motion difference information to a motion predictor or a motion candidate for the current video block.

8. The method of claim 1, further comprising:

determining whether to insert a target motion candidate for the current video block into a prediction list for the current video block based on a comparison between the target motion candidate and at least one existing motion candidate in the prediction list; and performing the conversion based on the determination.

9. The method of claim 8, wherein the prediction list comprises one of:

a geometric partition mode (GPM) candidate list, a multi-hypothesis prediction (MHP) base hypothesis candidate list, a template matching (TM) candidate list, a decoder-side motion vector refinement (DMVR) candidate list, a block-based decoder-side motion vector refinement (BDMVR) candidate list, a multi-pass decoder-side motion vector refinement (MPDMVR) candidate list, or a regular advanced motion vector prediction (AMVP) candidate list, or wherein the at least one existing motion candidate comprises all of existing motion candidates in the prediction list, or wherein determining whether to insert the target motion candidate into the prediction list comprises:

determining whether the target motion candidate and a first existing motion candidate of the at least one existing motion candidate are identical; and when the target motion candidate and the first existing motion candidate are identical, determining that the target motion candidate is not inserted into the prediction list.

10. The method of claim 9, wherein determining whether the target motion candidate and the first existing motion candidate are identical comprises:

determining whether a motion vector (MV) for the target motion candidate and a MV for the first existing motion candidate are identical; and when the MV for the target motion candidate and the MV for the first existing motion candidate are identical, determining that the target motion candidate and the first existing motion candidate are identical, or wherein determining whether the target motion candidate and the first existing motion candidate are identical comprises:

determining whether a reference index for the target motion candidate and a reference index for the first existing motion candidate are identical; and when the reference index for the target motion candidate and the reference index for the first existing motion candidate are identical, determining that the target motion candidate and the first existing motion candidate are identical, or wherein determining whether the target motion candidate and the first existing motion candidate are identical comprises:

determining whether a bi-prediction with CU-level weight (BCW) index for the target motion candidate and a BCW index for the first existing motion candidate are identical; and when the BCW index for the target motion candidate and the BCW index for the first existing motion candidate are identical, determining that the target motion candidate and the first existing motion candidate are identical.

11. The method of claim 8, wherein determining whether to insert the target motion candidate into the prediction list comprises:

determining a difference between the target motion candidate and a first existing motion candidate of the at least one existing motion candidate by using at least one threshold; and determining whether to insert the target motion candidate into the prediction list based on the difference.

12. The method of claim 11, wherein determining the difference between the target motion candidate and the first existing motion candidate comprises: determining a motion vector difference between a MV for the target motion candidate and a MV for the first existing motion candidate by using a first threshold of the at least one threshold, or wherein one of the at least one threshold is dependent on coded information of the video.

13. The method of claim 12, wherein the coded information comprises at least one of:

a motion vector precision of a motion candidate,

BCW information, local illumination compensation (LIC) information, motion compensation interpolation filter information, overlapped block motion compensation (OBMC) information, a width of a coding unit, or a height of the coding unit, or wherein the coded information comprises types of prediction lists.

14. The method of claim 8, wherein performing the conversion comprises:

updating the prediction list by appending at least one additional candidate for the current video block at the end of the prediction list; and performing the conversion based on the updated prediction list.

15. The method of claim 14, wherein the prediction list is a GPM prediction list or a MHP prediction list for additional hypothesis generation, wherein the number of at least one additional candidate is dependent on the maximum allowed length of the prediction list.

16. The method of claim 15, wherein the maximum allowed length of the prediction list is predefined, or the maximum allowed length of the prediction list is indicated in the bitstream, or wherein when the number of existing motion candidate in the prediction list is less than the maximum allowed length of the prediction list, the at least one additional candidate is inserted into the prediction list until the number of existing motion candidate in the prediction list reach the maximum allowed length of the prediction list.

17. The method of claim 8, wherein performing the conversion comprises:

updating the prediction list by appending at least one additional candidate for the current video block at the end of the prediction list; and performing the conversion based on the updated prediction list, or wherein when template matching based motion refinement is applied to one of the following, the prediction list comprises template matching based prediction list:
GPM motion candidates,
combined intra and inter prediction (CIIP) motion candidates, or
MHP additional hypothetic motion candidates.

18. The method of claim 1, wherein the conversion includes encoding the current video block into the bitstream, or wherein the conversion includes decoding the current video block from the bitstream.

19. An apparatus for processing video data comprising a processor and a non-transitory memory with instructions thereon, wherein the instructions upon execution by the processor, cause the processor to perform a method comprising:

determining, during a conversion between a current video block of a video and a bitstream of the video, target motion information for the current video block based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; and performing the conversion based on the target motion information, wherein a first set of syntax elements related to the implicit motion refinement approach follow a second set of syntax elements related to the explicit motion refinement approach in the bitstream.

20. A non-transitory computer-readable storage medium storing instructions that cause a processor to perform a method comprising:

determining, during a conversion between a current video block of a video and a bitstream of the video, target motion information for the current video block based on a target approach determined from an implicit motion refinement approach and an explicit motion refinement approach, the implicit motion refinement approach being a decoder-side motion refinement approach, the explicit motion refinement approach being used for determining a motion difference information indicated in the bitstream; and performing the conversion based on the target motion information, wherein a first set of syntax elements related to the implicit motion refinement approach follow a second set of syntax elements related to the explicit motion refinement approach in the bitstream.

21. The method of claim 1, further comprising:

storing the bitstream in a non-transitory computer-readable recording medium.

* * * * *